US010991033B2

(12) United States Patent
Matsunaga et al.

(10) Patent No.: US 10,991,033 B2
(45) Date of Patent: *Apr. 27, 2021

(54) OPTIMIZATION OF DELIVERY TO A RECIPIENT IN A MOVING VEHICLE

(71) Applicant: INTERNATIONAL BUSINESS MACHINES CORPORATION, Armonk, NY (US)

(72) Inventors: Takuya Matsunaga, Chiba-ken (JP); Masakuni Okada, Chiba (JP); Hayato Uenohara, Chiba (JP); Hiroki Yoshinaga, Chiba (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 487 days.

This patent is subject to a terminal disclaimer.

(21) Appl. No.: 15/336,921

(22) Filed: Oct. 28, 2016

(65) Prior Publication Data

US 2018/0121991 A1 May 3, 2018

(51) Int. Cl.
*G06Q 50/30* (2012.01)
*G06Q 50/28* (2012.01)
(Continued)

(52) U.S. Cl.
CPC ..... *G06Q 30/0635* (2013.01); *G01C 21/3605* (2013.01); *G01C 21/3691* (2013.01);
(Continued)

(58) Field of Classification Search
CPC .... G06Q 30/0635; G06Q 50/28; G06Q 50/30; G06Q 10/0833; G06Q 10/0836; G06F 16/9537; G06C 21/3605; G06C 21/3691
(Continued)

(56) References Cited

U.S. PATENT DOCUMENTS 6,292,784 B1  9/2001 Martin
6,574,603 B1  6/2003 Dickson et al.
(Continued)

FOREIGN PATENT DOCUMENTS

WO       2007041672 A2      4/2007
WO    WO-2012135143 A2 * 10/2012  ............. G06Q 50/28
WO       2014205549 A1     12/2014

OTHER PUBLICATIONS

Wang, Hsiao-Fan, and Ying-Yen Chen. "A genetic algorithm for the simultaneous delivery and pickup problems with time window." 2012) Computers & Industrial Engineering 62.1 pp. 84-95. (Year: 2012).*

(Continued)

*Primary Examiner* — Marissa Thein
*Assistant Examiner* — Elisa H Yang
(74) *Attorney, Agent, or Firm* — Cantor Colburn LLP; Reza Sarbakhsh

(57) ABSTRACT

A method includes receiving a first signal originating from a first communication device located in a vehicle, the first signal indicating a requested product or service, a receiving time for the requested product or service, and a moving route of the vehicle, determining a receiving location of the requested product or service based on the receiving time and the moving route indicated by the first signal, and transmitting a second signal to a second communication device associated with the determined receiving location, the second signal indicating an instruction to prepare the requested product or service.

15 Claims, 17 Drawing Sheets

(51) Int. Cl.
  *G06Q 30/06* (2012.01)
  *G01C 21/36* (2006.01)
  *G06F 16/9537* (2019.01)
  *G06Q 10/08* (2012.01)

(52) U.S. Cl.
  CPC ..... *G06F 16/9537* (2019.01); *G06Q 10/0833* (2013.01); *G06Q 50/28* (2013.01); *G06Q 50/30* (2013.01)

(58) Field of Classification Search
  USPC ....................................................... 705/26.81
  See application file for complete search history.

(56) References Cited

U.S. PATENT DOCUMENTS

| | | | |
|---|---|---|---|
| 7,974,873 B2* | 7/2011 | Simmons | G06Q 10/06313 705/7.29 |
| 8,504,295 B2* | 8/2013 | Lerenc | G01C 21/3438 701/527 |
| 8,732,028 B2 | 5/2014 | Napper | |
| 9,639,908 B1* | 5/2017 | Reiss | G06Q 50/12 |
| 2011/0288958 A1* | 11/2011 | Obasanjo | G06Q 10/08 705/26.81 |
| 2013/0024299 A1 | 1/2013 | Wong et al. | |

OTHER PUBLICATIONS

List of IBM Patents or Patent Applications Treated as Related; (Appendix P), Date Filed Oct. 30, 2017; 2 pages.

Matsunaga, Takuya et al., "Optimization of Delivery to a Recipient in a Moving Vehicle"; U.S. Appl. No. 15/796,883, filed Oct. 30, 2017.

Kanth, Rajani K. Article entitled "Order food, really fast", Jul. 6, 2015; retrieved from: http://www.business-standard.com/article/companies/order-food-really-fast-115070600034_1.html; 10 pgs.

Wang HF, Chen YY. A genetic algorithm for the simultaneous delivery and pickup problems with time windwow: Computer & Industrial Engineering. Feb. 1, 2012;62(1):84-95. (Year: 2012).

* cited by examiner

| Driver | Product/Service | Receiving Time | Timing Preference | Receiving Location |
|---|---|---|---|---|
| DriverID1 | Hamburger | 11:45 | Err Early | StoreID1 |
| DriverID2 | Cheeseburger | 11:50 | None | StoreID1 |
| DriverID3 | Smoothie | 11:50 | Err Late | DeliverySiteID1 via StoreID2 |
| DriverID4 | [Item Data] | [Time Data] | [Selection] | [Location Data] |
| ... | ... | ... | ... | ... |

| Driver | Moving Route | Traffic/Weather |
|---|---|---|
| DriverID1 | [Route Data] | [Traffic/Weather Data] |
| DriverID2 | [Route Data] | [Traffic/Weather Data] |
| DriverID3 | [Route Data] | [Traffic/Weather Data] |
| DriverID4 | [Route Data] | [Traffic/Weather Data] |
| ⋮ | ⋮ | ⋮ |

| Store | Position | Product/Service | Preparation Time | Delivery |
|---|---|---|---|---|
| StoreID1 | [Position Data] | Hamburger | 0:05 | 10 miles |
| StoreID1 | [Position Data] | Cheeseburger | 0:05 | 10 miles |
| StoreID2 | [Position Data] | Smoothie | 0:03 | 15 miles |
| StoreID2 | [Position Data] | [Item Data] | [Time Data] | [Area Data] |
| ▪▪ | ▪▪ | ▪▪ | ▪▪ | ▪▪ |

| Driver | Delivery Route | Traffic/Weather |
|---|---|---|
| DriverID3 | [Route Data] | [Traffic/Weather Data] |
| DriverID4 | [Route Data] | [Traffic/Weather Data] |
| DriverID5 | [Route Data] | [Traffic/Weather Data] |
| DriverID6 | [Route Data] | [Traffic/Weather Data] |
| ⋮ | ⋮ | ⋮ |

*FIG. 6*

OPTIMIZATION OF DELIVERY TO A RECIPIENT IN A MOVING VEHICLE

BACKGROUND

The present invention relates to optimization of delivery to a recipient in a moving vehicle.

At an increasing number of restaurants and other stores, it is possible to place orders (e.g. fast food orders) ahead of time by telephone or via a website or mobile app. In the near future, this trend may apply not only to orders for products to be picked up but also to services, such as roadside services (e.g. fueling, charging, cleaning, or servicing a vehicle). When placing an order for such a product or service while in transit, various problems arise, such as arriving at the store early or late. Conventionally, some of these problems are addressed by estimating the user's arrival time at the store and the order completion time. However, even if such conventional methods are used, further problems exist. For example, even if a user's arrival time is accurately estimated and coincides with the order completion time, such time might no longer be the preferred time for receiving the order due to unexpected weather or traffic conditions. In the case of a food order, the user may not wish to eat an hour earlier or later than intended because the user might not be hungry yet or might be too hungry.

Moreover, a user who is in transit may wish to minimize the delay associated with reaching a store located off the user's route. Conventional systems offer no solution to this problem.

SUMMARY

Embodiments include methods, systems and computer program products for optimization of delivery to a recipient in a moving vehicle. Aspects include receiving a first signal originating from a first communication device located in a vehicle, the first signal indicating a requested product or service, a receiving time for the requested product or service, and a moving route of the vehicle. Aspects also include determining a receiving location of the requested product or service based on the receiving time and the moving route indicated by the first signal. Aspects further include transmitting a second signal to a second communication device associated with the determined receiving location, the second signal indicating an instruction to prepare the requested product or service.

BRIEF DESCRIPTION OF THE DRAWINGS

FIG. 2 shows example contents of the order data storage.
FIG. 3 shows example contents of the moving route data storage.
FIG. 4 shows example contents of the store data storage.
FIG. 6 shows example contents of the delivery route data storage.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
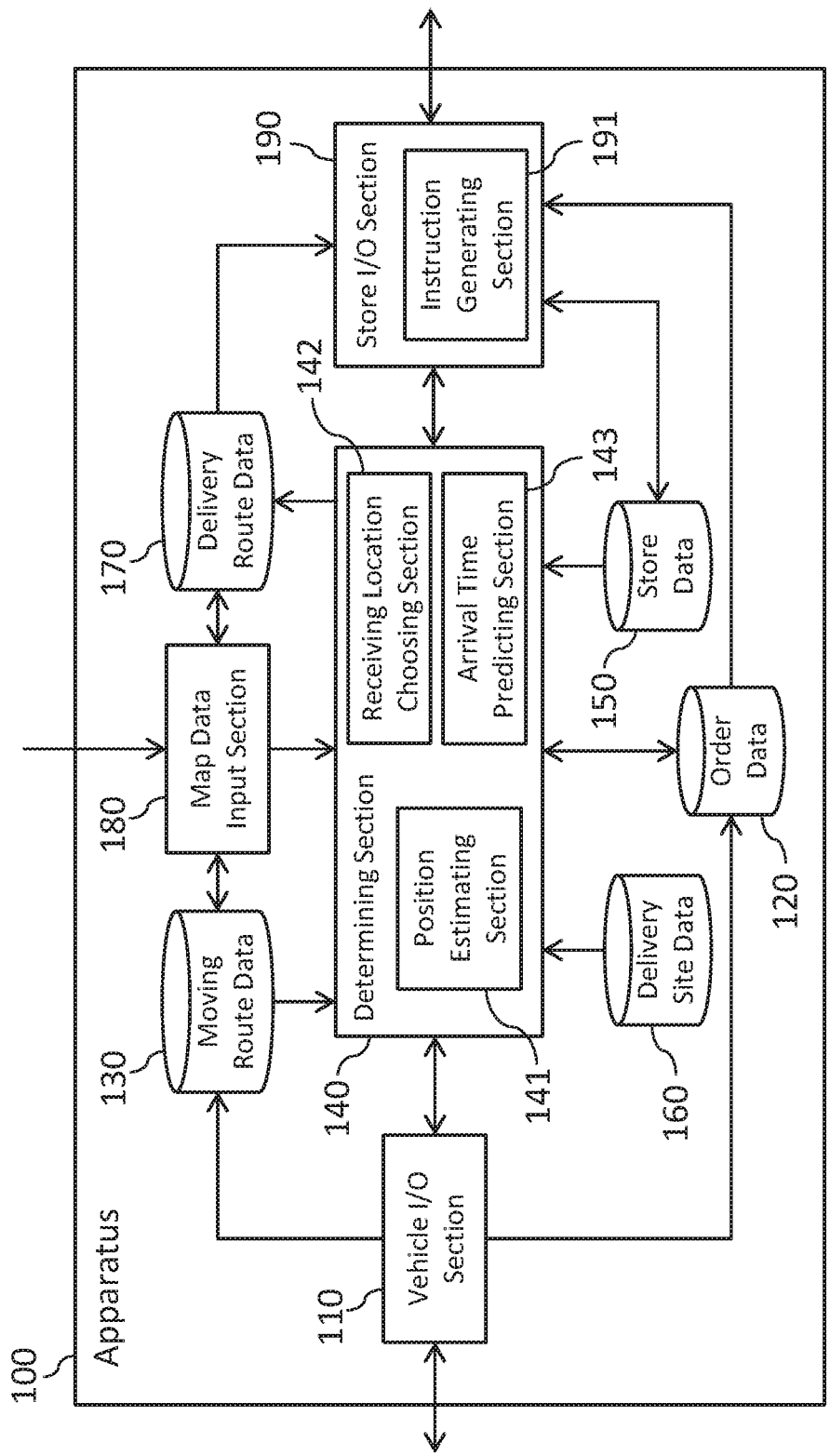
FIG. 1 shows an apparatus according to an embodiment.

FIG. 1 shows an apparatus 100 according to an embodiment of the present invention. The apparatus 100 receives a first signal originating from a first communication device located in a vehicle. The first signal indicates various items of information related to a user's order, including, for example, identification of a requested product or service, a receiving time for the requested product or service, and a moving route of the vehicle. On the basis of the receiving time and the moving route, the apparatus 100 determines a receiving location of the requested product or service, such as a delivery site or a particular location of a fast food restaurant in the case of a fast food order. The apparatus 100 then transmits a second signal, indicating an instruction to prepare the requested product or service, to a second communication device associated with the determined receiving location. The apparatus 100 includes a vehicle input/output (I/O) section 110, an order data storage 120, a moving route data storage 130, a determining section 140, a store data storage 150, a delivery site data storage 160, a delivery route data storage 170, a map data input section 180, and a store input/output (I/O) section 190.

The vehicle input/output (I/O) section 110 receives a first signal originating from a first communication device located in a vehicle. The first communication device may be, for example, a component of the vehicle or a separate device in which GPS or other navigation software is installed, including a dedicated navigation device or a mobile phone or other portable electronic communication device. The first communication device may be a vehicle navigation device installed in the vehicle or a mobile communication device running a vehicle navigation program. The first communication device may be a combination of such devices, e.g., a mobile phone and an onboard navigation device. One or more signals transmitted from the first communication device eventually arrive, either in original or altered form, at the vehicle I/O section 110 of the apparatus 100, for example, via a base station of a wireless communication network, the Internet, and/or receiving hardware such as a receiver or transceiver. In this way, the first signal received by the vehicle I/O section 110 originates from the first communication device. The first signal may refer to multiple separate signals and need not be the same signal or signals that were transmitted from the first communication device, provided that the first signal conveys information about the transmitted signal or signals. The first signal may convey information about a series of voice commands, and the vehicle I/O section 110 may communicate with the first communication device such that the first communication device presents conversation prompts to the user of the first communication device. In this way the user can interact with the apparatus 100 by voice conversation via the first communication device.

The first signal indicates a requested product or service, a receiving time for the requested product or service, and a moving route of the vehicle. The first signal may further indicate a selection between erring on the side of completing the preparation of the requested product or service before the receiving time and erring on the side of completing the preparation of the requested product or service after the receiving time. For example, the first signal may indicate that the user of the first communication device would like a hamburger from a specific restaurant chain at 11:45 erring on the early side (e.g. prioritizing timeliness over freshness), as well as indicating the moving route as route data associated with the vehicle. The route data may be of a form used by any GPS or other navigation system and may include, for example, a current position, a destination, a starting position, and/or path information. The destination and the starting position can be a destination and a starting position of an entire trip or of a portion of the trip around the location where the vehicle is estimated to be located at the receiving time. The requested product or service and the receiving time, as well as any timing preference, may be designated by a user of the first communication device by any input device, e.g. mouse input, keyboard input, touchscreen input, eye tracking input, voice commands, and/or gestures. The moving route may be similarly designated by the user or may be determined by the navigation software of the first communication device.

The vehicle I/O section 110 stores the requested product or service and receiving time in association with the first communication device or user (e.g. driver) in the order data storage 120. The vehicle I/O section 110 stores the moving route in association with the first communication device or user (e.g. driver) in the moving route data storage 130. The vehicle I/O section 110 may thereafter receive additional signals from the first communication section in association with the first signal. For example, the vehicle I/O section 110 may regularly receive signals updating the moving route data, e.g. a new current position, speed, etc. of the vehicle. The vehicle I/O section 110 may store the updated moving route data in the moving route data storage 130, e.g. by replacing previous moving route data.

The order data storage 120 stores an order list including one or more orders, and each order in the order list may include an identification of the requested product or service and receiving time, along with the timing preference if any, in association with the first communication device or user (e.g. driver). The order data storage 120 further stores, in association with the first communication device or user (e.g. driver), a receiving location of the first product or service after the receiving location is determined by the apparatus 100.

The moving route data storage 130 stores the moving route (e.g. route data used by any navigation system) in association with the first communication device or user (e.g. driver). The moving route data storage 130 further stores, in association with the first communication device or user (e.g. driver), traffic and/or weather data associated with the moving route after the traffic and/or weather data is added by the apparatus 100.

The determining section 140 determines a receiving location of the requested product or service based on the receiving time and the moving route indicated by the first signal. The receiving location may be a store offering the requested product or service. For example, in a case where the first signal indicates that the user of the first communication device would like a hamburger from a specific restaurant chain, the receiving location may be a particular store/location of that restaurant chain. Thus, the determining section 140 may determine the particular store/location of the restaurant chain, with the particular store/location of the restaurant chain being the receiving location. Alternatively, the receiving location may be a delivery site located on or near the moving route a distance away from a store offering the requested product or service. For example, in a case where the first signal indicates that the user of the first communication device would like a hamburger from a specific restaurant chain, the receiving location may be a delivery site, e.g. a curb-side or other convenient location a distance away from a particular store/location of the restaurant chain. Thus, the determining section 140 may determine the particular store/location of the restaurant chain as well as a delivery site, with the delivery site being the receiving location. The determining section 140 includes a position estimating section 141, a receiving location choosing section 142, and an arrival time predicting section 143.

The position estimating section 141 estimates a position on the moving route of the vehicle at the receiving time. For example, upon being notified of a new order (e.g. being notified of the receipt and storage of a new first signal originating from a first communication device) by the vehicle I/O section 110, the position estimating section 141 may reference the receiving time stored in the order data storage 120 and the moving route stored in the moving route data 130 in association with the first communication device. On the basis of the receiving time and the moving route, the position estimating section 141 may estimate the future position at the receiving time (i.e. where the vehicle will be) by known methods. For example, the position estimating section 141 may i) multiply the speed of the vehicle (e.g. assumed speed based on route data and traffic/weather data stored in the moving route data storage 130) by the difference between the receiving time and the current time and ii) add the resulting distance to the current position of the vehicle along the moving route. If the estimated position is estimated based on traffic/weather data stored in the moving route data storage 130, e.g. as described above, it can be said that the determining section 140 determines the receiving location based on a traffic or weather condition of the moving route.

The receiving location choosing section 142 chooses a store offering the requested product or service based on the estimated position. In the case where the receiving location is a delivery site, the receiving location choosing section 142 may further choose the delivery site based on the estimated position. For example, the receiving location choosing section 142 may choose a store near the estimated position or a store and a delivery site near the estimated position. The receiving location choosing section 142 may choose the store from a plurality of predetermined stores, e.g. stores whose data, including position data, is stored in the store data storage 150. The receiving location choosing section 142 may choose a delivery site from a plurality of predetermined delivery sites, e.g. delivery sites whose data, including position data, is stored in the delivery site data storage 160. For example, the receiving location choosing section 142 may choose the delivery site from among those within the delivery radius of the chosen store stored in the store data storage 150. The delivery radius may be literally a radius, e.g. a distance, or may be a specific delivery area that may or may not overlap with delivery areas of neighboring stores. The receiving location choosing section 142 may store the determined receiving location in the order data storage 120 in association with the order, i.e., in association with the first communication device or user (e.g. driver), the requested product or service, and the receiving time. In a case where the receiving location is a delivery site, the receiving location choosing section 142 may further store, together with the determined receiving location, the chosen store.

The arrival time predicting section 143 predicts an arrival time of the vehicle at the receiving location based on the moving route indicated by the first signal. Because the chosen receiving location may not be exactly at the estimated position, the first communication device will generally arrive at the receiving location at a different time than the original receiving time of the first signal. Therefore, the arrival time predicting section 143 may predict an arrival time that is different from the original receiving time. To predict the arrival time, the arrival time predicting section 143 may use known methods. For example, the arrival time predicting section 143 may i) find the distance, along the moving route plus any detour route connecting the moving route with the receiving location, between the current position of the vehicle and the position of the receiving location (e.g. based on route data stored in the moving route data storage 130, map data received by the map data input section 180, and position data of the receiving location stored in the store data storage 150 or the delivery site data storage 160) and ii) divide the resulting distance by the speed of the vehicle (e.g. assumed speed based on route data and traffic/weather data stored in the moving route data storage 130). If the arrival time is predicted based on traffic/weather data stored in the moving route data storage 130, e.g. as described above, it can be said that the arrival time predicting section 143 predicts the arrival time based on a traffic or weather condition of the moving route. If the apparatus 100 has received one or more updates to the moving route data (e.g. current position, speed, etc.) from the first communication device after receipt of the first signal, the arrival time predicting section 143 may use updated moving route data stored in the moving route data storage 130 in predicting the arrival time. The arrival time predicting section 143 may update the receiving time based on the predicted arrival time, for example, by replacing the receiving time stored in the order data 120 with the predicted arrival time.

The store data storage 150 stores information about each of a plurality of stores. For example, the store data storage 150 may store, for each store, position data representing the location of the store (e.g. map coordinates), identification of one or more products or services offered by the store, a preparation time for each of the products or services, and a delivery radius of the store (or of each individual product or service offered by the store). Thus, by means of the store data storage 150, the apparatus 100 may maintain a store database in which information indicating an estimated preparation time is stored in association with products or services and a plurality of stores offering the products or services.

The delivery site data storage 160 stores information about each of a plurality of delivery sites. For example, the delivery site data storage 160 may store, for each delivery site, position data representing the location of the delivery site (e.g. map coordinates).

The delivery route data storage 170 stores a delivery route (e.g. route data used by any navigation system) in association with the first communication device or user (e.g. driver). A delivery route is stored in a case where the receiving location is a delivery site a distance away from a store offering the requested product or service. The delivery route is the route between the store and the delivery site determined by the determining section 140 and may be determined, for example, on the basis of the position data stored in the store data storage 150 and delivery site data storage 160 and map data received by the map data input section 180. The delivery route data storage 170 further stores, in association with the first communication device or user (e.g. driver), traffic and/or weather data associated with the delivery route after the traffic and/or weather data is added by the map data input section 180.

The map data input section 180 obtains map data. The map data may include, for example, an up-to-date map of an area near the first communication device or moving route. The map data may further include information about current conditions affecting traffic, e.g. traffic and/or weather data. The map data input section 180 may obtain the map data from outside the apparatus 100, for example, from an external storage or from a computer or server through a network such as the Internet, WAN, and/or LAN. The map data input section 180 may obtain the map data from the first communication device.

The map data input section 180 may update the data stored in the moving route data storage 130 and the delivery route data storage 170 at regular intervals or upon the occurrence of a designated event (e.g. upon the entry of new data in the moving route data storage 130 or the delivery route data storage 170). For example, the map data input section 180 may reference the route data of a moving route stored in the moving route data storage 130 and add, to the moving route data storage 130, traffic and/or weather data corresponding to the moving route. Such traffic and/or weather data may then be used by the determining section 140, for example, to determine the receiving location or to predict the arrival time of the vehicle at the receiving location. Similarly, the map data input section 180 may reference the route data of a delivery route stored in the delivery route data storage 170 add, to the delivery route data storage 170, traffic and/or weather data corresponding to the delivery route. Such traffic and/or weather data may then be used by the store I/O section 190, for example, to generate an instruction to prepare the requested product or service.

The store I/O section 190 transmits a second signal to a second communication device associated with the determined receiving location, the second signal indicating an instruction to prepare the requested product or service. The second communication device may be, for example, a dedicated or general purpose computer or other device programmed to receive the second signal, for example, via a base station of a wireless communication network, the Internet, and/or receiving hardware such as a receiver or transceiver. The second communication device is associated with the receiving location in the sense that, upon receipt of the second signal by the second communication device, information contained in the second signal can readily be used to prepare the requested product or service at or for delivery to the receiving location. For example, in a case where the receiving location is a store offering the requested product or service, the second communication device may be associated with the receiving location in that the second communication device is located at the receiving location or at another location (e.g. a headquarters) in communication with the receiving location. In a case where the receiving location is a delivery site, the second communication device may be associated with the receiving location in that the second communication device is located at the determined store that can deliver to the receiving location or at another location (e.g. a headquarters) in communication with the store. Just as the first signal may refer to multiple separate signals, the second signal may also refer to multiple separate signals.

The store I/O section 190 includes an instruction generating section 191. The instruction generating section 191 generates the instruction indicated by the second signal. The second signal may indicate an instruction to finish preparing the requested product or service at the receiving time or to begin or finish preparing the requested product or service at a specified time prior to the receiving time.

For example, upon receiving an indication from the determining section 140 that an order in the order data storage 120 has been created or updated, the instruction generating section 191 may reference the order data storage 120 and generate an instruction based on the order data. The instruction may be, for example, to finish preparing a hamburger (requested product or service) at 11:45 (receiving time) for DriverID1 (driver). Further referencing the order data storage 120, the store I/O section 190 may transmit the second signal including such instruction to the second communication device associated with StoreID1 (receiving location).

As another example, upon receiving an indication from the determining section 140 that an order in the order data storage 120 has been created or updated, the instruction generating section 191 may reference the order data storage 120 and the store data storage 150 and generate an instruction based on the order data and the store data. Based on the preparation time stored in association with the product/service and store in the store data storage 150, the instruction generating section 191 may specify a time to begin preparing the requested product or service. The instruction may be, for example, to begin preparing a hamburger (requested product or service) at 11:40 (specified time equals receiving time of 11:45 minus preparation time of 5 minutes) for DriverID1 (driver). Further referencing the order data storage 120, the store I/O section 190 may transmit the second signal including such instruction to the second communication device associated with StoreID1 (receiving location). In this way, the second signal may indicate an instruction to begin preparing the requested product or service at a specified time prior to the receiving time.

As another example, upon receiving an indication from the determining section 140 that an order in the order data storage 120 has been created or updated, the instruction generating section 191 may reference the order data storage 120 and generate an instruction based on the order data. The instruction may be, for example, to begin preparing a hamburger (requested product or service) for DriverID1 (driver). The store I/O section 190 may reference the store data storage 150 and, based on the preparation time stored in association with the product/service and store, determine a specified time to begin preparing the requested product or service. The store I/O section 190 may transmit the second signal including such instruction to the second communication device associated with StoreID1 (receiving location) at 11:40 (specified time equals receiving time or 11:45 minus preparation time of 5 minutes). In this way as well, the second signal may indicate an instruction to begin preparing the requested product or service at a specified time prior to the receiving time. That is, the instruction may indicate the specified time with its arrival, i.e. "now."

As another example, upon receiving an indication from the determining section 140 that an order in the order data storage 120 has been created or updated, in a case where the order indicates a delivery site as the receiving location, the instruction generating section 191 may reference the order data storage 120 and the delivery route data storage 170 and generate an instruction based on the order data and the delivery route data. Based on the route data stored in association with the user (DriverID3) of the first communication device, i.e. the route from the store to the delivery site, the instruction generating section 191 may specify a time to begin or finish preparing the requested product or service. The specified time may be determined based on the distance of the delivery site from the store (e.g. based on route data stored in the delivery route data storage 170) and may further be determined based on a traffic or weather condition of the delivery route (e.g. based on traffic/weather data stored in the delivery route data storage 170). For example, the instruction generating section 191 may divide the distance by the speed of a delivery vehicle (e.g. assumed speed based on delivery route data and traffic/weather data stored in the delivery route data storage 170). The resulting delivery time may be subtracted from the receiving time to determine the specified time. The instruction may be, for example, to finish preparing a smoothie (requested product or service) at 11:40 (specified time equals receiving time of 11:50 minus delivery time of 10 minutes) for delivery to DeliverySiteID1 (receiving location) for DriverID3 (driver). As another example, the instruction may be to begin preparing a smoothie (requested product or service) at 11:37 (specified time equals receiving time of 11:50 minus delivery time of 10 minutes minus preparation time of 3 minutes) for delivery to DeliverySiteID1 (receiving location) for DriverID3 (driver). Further referencing the order data storage 120, the store I/O section 190 may transmit the second signal including such instruction to the second communication device associated with StoreID2 (store determined along with determining delivery site as receiving location). Alternatively, as above, the instruction may not include the specified time and the second signal may instead be transmitted at the specified time (at least in cases where the specified time is a time to begin preparing the requested product). In these ways, the second signal may indicate an instruction to begin or finish preparing the requested product or service at a specified time prior to the receiving time.

In a case where the first signal further indicates a selection between erring on the side of completing the preparation of the requested product or service before the receiving time and erring on the side of completing the preparation of the requested product or service after the receiving time, the second signal may indicate an instruction to finish preparing the requested product or service at a modified receiving time based on the receiving time and the selection or to begin or finish preparing the requested product or service at a specified time prior to the receiving time, the specified time determined based on the selection. Thus, in any of the above examples, the receiving time indicated by the second signal may be a modified version of the receiving time stored in the order data storage 120 shifted early or late depending on the timing preference selection stored in the order data storage 120. Similarly, in any of the above examples, the specified time indicated by the second signal may be shifted early or late based on the timing preference selection stored in the order data storage 120. The shift amount may be a standard amount applied to all orders having a timing preference, e.g. three minutes, or may be an amount determined as a percentage of the time between the receiving time and the current time, e.g. 2%. Thus, for orders placed further in advance, a larger shift amount may be used because the margin for error may be greater. In the case where the shift amount is determined based on the time between the receiving time and the current time, the shift amount may be decreased as the vehicle approaches the receiving location and the error of the receiving time becomes smaller.

In addition to transmitting the second signal to the second communication device, the store I/O section 190 may receive various signals from the second communication device. In this respect, the second communication device may further be programmed to send signals, for example, via a base station of a wireless communication network, the Internet, and/or transmitting hardware such as a transmitter or transceiver, and the store I/O section 190 may receive such signals, either in original or altered form, for example, via a base station of a wireless communication network, the Internet, and/or receiving hardware such as a receiver or transceiver. For example, if an unexpected delay or difficulty requires a change or cancellation of an order, the second communication device may transmit a signal to the apparatus 100 with such information, which can then be used by the determining section 140 to update the order stored in the order data storage 120 and/or notify the user of the first communication device via the vehicle I/O section 110. The second communication device may also periodically, or at the occurrence of an event, transmit a signal to the apparatus 100 indicating a change in the store data of a store associated with the second communication device. For example, new products or services may become available or no longer be available, or the preparation time for a product or service may change depending on how busy the store is and other factors. The apparatus 100, e.g. the vehicle I/O section 110, may update the store data storage 150 to reflect an increase or decrease in the estimated preparation time associated with a product or service offered at a store due to a current workload or preparation speed condition of the store.

In the example of the apparatus 100 shown in FIG. 1, the receiving location choosing section 142 chooses the store based on the estimated position whether the receiving location is the store itself or a delivery site. However, in an alternative embodiment, the receiving location choosing section 142 may choose only the delivery site based on the estimated position, with the store being determined based on the chosen delivery site. In such a case, the delivery site data storage 160 may store, for each delivery site, in addition to the position data representing the location of the delivery site, information about which stores (and/or specific products of stores) allow delivery to the delivery site or the location of the delivery site. On the basis of such information, a store may be determined based on a chosen delivery site.

FIG. 2 shows example contents of the order data storage 120. As shown, for each of a plurality of first communication devices or users (Driver=DriverID1, DriverID2, etc.), the order data storage 120 stores the requested product or service indicated by the first signal (Product/Service=Hamburger, Cheeseburger, etc.), the receiving time indicated by the first signal or an updated receiving time (Receiving Time=11:45, 11:50, etc.), a selection, indicated by the first signal, between erring on the side of completing the preparation of the requested product or service before or after the receiving time (Timing Preference=Err Early, None, etc.), and a receiving location or updated receiving location of the first product or service determined by the apparatus 100 (Receiving Location=StoreID1, DeliverySiteID1 via StoreID2, etc.). When the contents of the order data storage 120 are organized in table form as shown, each row constitutes an order.

FIG. 3 shows example contents of the moving route data storage 130. As shown, for each of a plurality of first communication devices or users (Driver=DriverID1, DriverID2, etc.), the moving route data storage 130 stores the moving route indicated by the first signal (Moving Route=[RouteData]) and traffic and/or weather data associated with the moving route and added by the apparatus 100, e.g. the map data input section 180 (Traffic/Weather=[TrafficWeather Data]). When the contents of the moving route data storage 130 are organized in table form as shown, each row corresponds to an order stored in the order data storage 120.

FIG. 4 shows example contents of the store data storage 150. As shown, for each of a plurality of stores (Store=StoreID1, StoreID2, etc.), the store data storage 150 stores information about the location of the store (Position=[Position Data]), one or more offered products or services (Product/Service=Hamburger offered by StoreID1, Cheeseburger offered by StoreID1, Smoothie offered by StoreID2, etc.), the approximate preparation time of the product or service (Preparation Time=0:05, 0:03, etc.), and a delivery radius of the store, either associated with the store or an individual product or service (Delivery=10 miles, 15 miles, etc. or 0 miles, "N/A," etc. if delivery is not supported). When the contents of the store data storage 150 are organized in table form as shown, each set of rows (e.g. the first two rows in FIG. 4) corresponds to a selection of products or services offered by a particular store.

Figure 5:
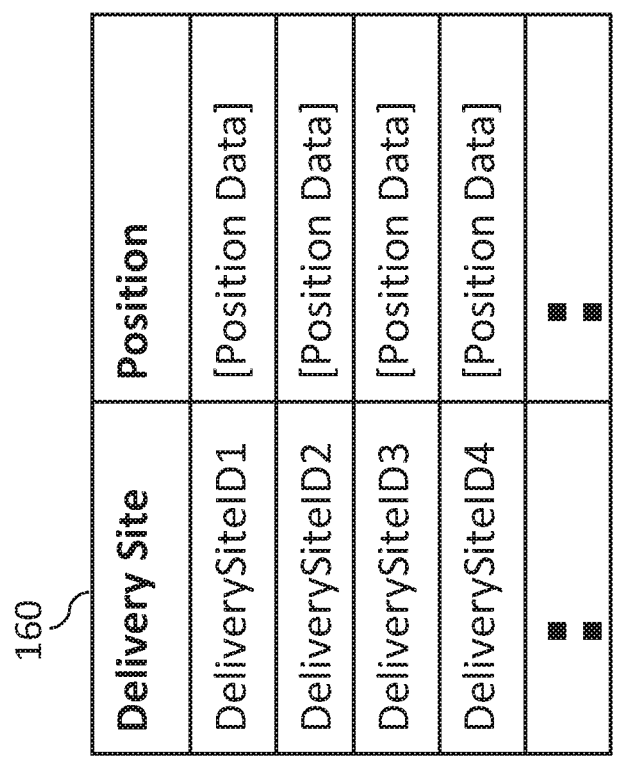
FIG. 5 shows example contents of the delivery site data storage.

FIG. 5 shows example contents of the delivery site data storage 160. As shown, for each of a plurality of delivery sites (Delivery Site=DeliverySiteID1, DeliverySiteID2, etc.), the delivery site data storage 160 stores information about the location of the delivery site (Position=[Position Data]). When the contents of the delivery site data storage 160 are organized in table form as shown, each row corresponds to a particular delivery site.

FIG. 6 shows example contents of the delivery route data storage 170. As shown, for each of a plurality of first communication devices or users (Driver=DriverID3, DriverID4, etc.) for which the receiving location is a delivery site, the delivery route data storage 170 stores the delivery route determined by the determining section 140 (Delivery Route=[Route Data]) and traffic and/or weather data associated with the delivery route and added by the apparatus 100, e.g. the map data input section 180 (Traffic/Weather=[Traffic/Weather Data]). When the contents of the delivery route data storage 170 are organized in table form as shown, each row corresponds to an order stored in the order data storage 120 (e.g. those orders for which the receiving location is a delivery site).

Figure 7:
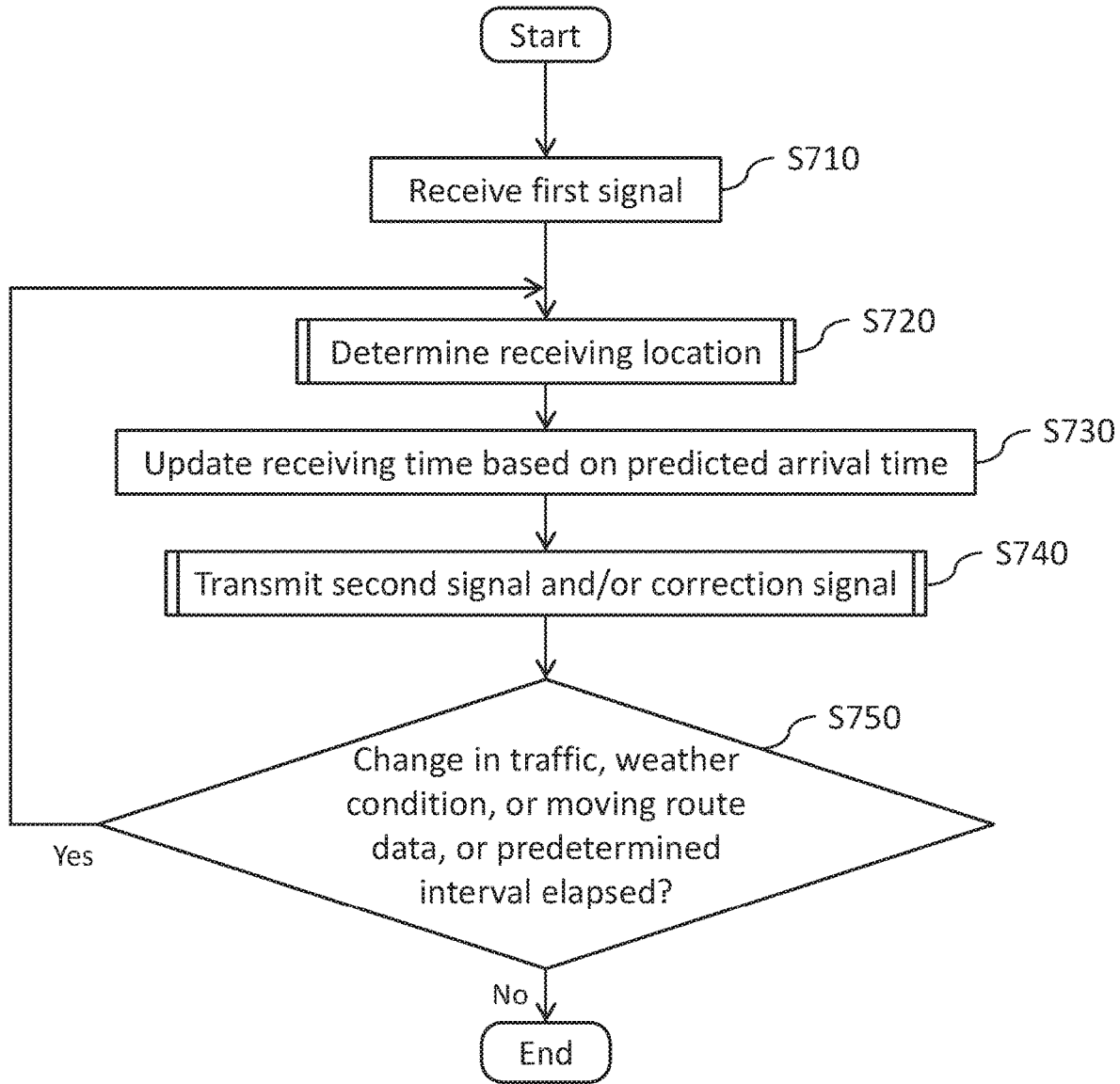
FIG. 7 shows an example operational flow of the apparatus according to an embodiment.

FIG. 7 shows an example operational flow of the apparatus 100 according to an embodiment of the present invention. In the example shown in FIG. 7, the apparatus 100 performs the operations from S710 to S750, but the apparatus 100 shown in FIG. 1 is not limited to using this operational flow. Also, the operational flow in FIG. 7 may be performed by a modified apparatus or a different apparatus that differs from the apparatus 100 shown in FIG. 1.

First, the apparatus 100 receives a first signal originating from a first communication device located in a vehicle (S710). The first signal indicates a requested product or service, a receiving time for the requested product or service, and a moving route of the vehicle. For example, the vehicle I/O section 110 of the apparatus 100 may receive the first signal from outside the apparatus 100 (e.g. from a driver of a vehicle), store the requested product or service and receiving time in the order data storage 120, and store the moving route in the moving route data storage 130.

Next, the apparatus 100 determines a receiving location of the requested product or service based on the receiving time and the moving route indicated by the first signal (S720). For example, upon receiving an indication from the vehicle I/O section 110 that an order has been created in the order data storage 120, the determining section 140 may reference the order data storage 120, the moving route data storage 130, the store data storage 150, and/or the delivery site data storage 160, and determine the receiving location based on the information stored therein. As a specific example, in the case of the order associated with DriverID1 stored in the example of the order data storage 120 shown in FIG. 2, the determining section 140 may reference the order data storage 120 and see that DriverID1 wants to receive a hamburger at 11:45 (ignoring, for this example, the optionally stored timing preference shown in FIG. 2). The determining section 140 may determine StoreID1 to be the receiving location with reference to the moving route data storage 130 and the store data storage 150 as described more specifically below with reference to FIGS. 8-10. The determining section 140 may then store the determined receiving location (StoreID1) in the order data storage 120 in association with the order.

As part of determining StoreID1 to be the receiving location in steps S720, the determining section 140 also predicts an arrival time of DriverID1 at StoreID1 as described below with reference to FIGS. 8-10. The apparatus 100 updates the receiving time based on the predicted arrival time (S730). For example, the determining section 140 may, along with storing the determined receiving location (StoreID1) in the order data storage 120, update the receiving time associated with the order by replacing it with the predicted arrival time. Updating the receiving time based on the predicted arrival time may include making no change to the receiving time (e.g. if the predicted arrival time is the same as the original receiving time). In this embodiment, the order data storage 120 stores the current receiving time but it does not store the requested (or original) receiving time. This allows the current receiving time to change to some extent, and the apparatus 100 can change the receiving location to track the change of the receiving time. Instead of this implementation, the order data storage 120 may store the requested receiving time as well as the current receiving time and may update the current receiving time based on the predicted arrival time, but keep the requested receiving time unchanged unless the apparatus 100 receives special instruction to change the requested receiving time. This implementation may enable the apparatus 100 to determine the receiving location strictly based on the requested receiving time instead of adaptively updating the receiving time and determining the receiving location based on the updated receiving time.

Next, the apparatus 100 transmits a second signal and/or a correction signal (S740). For example, in the case of a newly determined receiving location for a given order (e.g. the initially determined receiving location or a new receiving location for the order), the store I/O section 190 may transmit a second signal to a second communication device associated with the determined receiving location, the second signal indicating an instruction to prepare the requested product or service. If the newly determined receiving location is a new receiving location (i.e. if there was a previously determined receiving location for the same order), the store I/O section 190 may further transmit a correction signal to the previously determined receiving location indicating that an instruction of a previous second signal or a previous correction signal is canceled. On the other hand, in the case of an updated arrival time for a previously determined receiving location, the store I/O section 190 may transmit a correction signal to the second communication device associated with the determined receiving location. For example, if a previous second signal (or correction signal) transmitted to the determined receiving location indicated an instruction to finish preparing the requested product or service at the receiving time or to begin or finish preparing the requested product or service at a specified time prior to the receiving time, the store I/O section 190 may transmit a correction signal to the second communication device that received the second signal or a previous correction signal, the correction signal indicating an instruction to finish preparing the requested product or service at a new receiving time or to begin or finish preparing the requested product or service at an updated specified time prior to the new receiving time.

If there has been a change in traffic or weather conditions or a change in the moving route data (e.g. a regular update to the current position, speed, etc. of the vehicle sent from the first communication device), or if a predetermined interval has elapsed ("Yes" at S750), the operation flow of FIG. 7 loops back prior to step S720 and the receiving location for the order is re-determined. In this way, the determining of the receiving location may be performed at predetermined intervals, and similarly, the predicting of the arrival time may be performed at predetermined intervals. For example, after being notified by the map data input section 180 or the vehicle I/O section 110 that there has been an update, e.g. a significant update, to the traffic/weather data or the moving route data (e.g. current position or speed) associated with the order (e.g. associated with DriverID1), the determining section 140 may re-reference the moving route data storage 130 and the store data storage 150, obtain the updated traffic/weather data, and re-determine the receiving location (e.g. a store other than StoreID1) as described more specifically below with reference to FIGS. 8-10. Whether or not a new receiving location is determined (i.e. even if the old receiving location is kept), the operational flow may then proceed through steps S730 and S740 again. That is, the apparatus 100 may update the receiving time based on a new predicted arrival time (S730) and transmit a second signal and/or a correction signal (S740).

In one example, the determination at step S750 may be made on the basis of both predetermined intervals and detection of a change in traffic or weather conditions or moving route data. For instance, the determination at step S750 may be made whenever there is a significant update (e.g. exceeding some threshold) in traffic or weather conditions or moving route data, but no less frequently than every predetermined interval. This way, insignificant changes in traffic or weather conditions will not cause new correction signals to be sent out, while periodic correction will still be ensured.

In the example operational flow shown in FIG. 7, a "Yes" result at step S750 causes the operational flow to loop back prior to step S720. However, in an alternative embodiment in which receiving locations are not re-determined, the operational flow may instead loop back prior to step S730. In this case, step S730 can be modified to include predicting the arrival time as well as updating the receiving time based on the predicted arrival time. The method of predicting the arrival time may be the same as in the case when predicting the arrival time is a sub-process of determining the receiving location (S720) as mentioned above and described in more detail below with reference to FIGS. 8-10.

Figure 8:
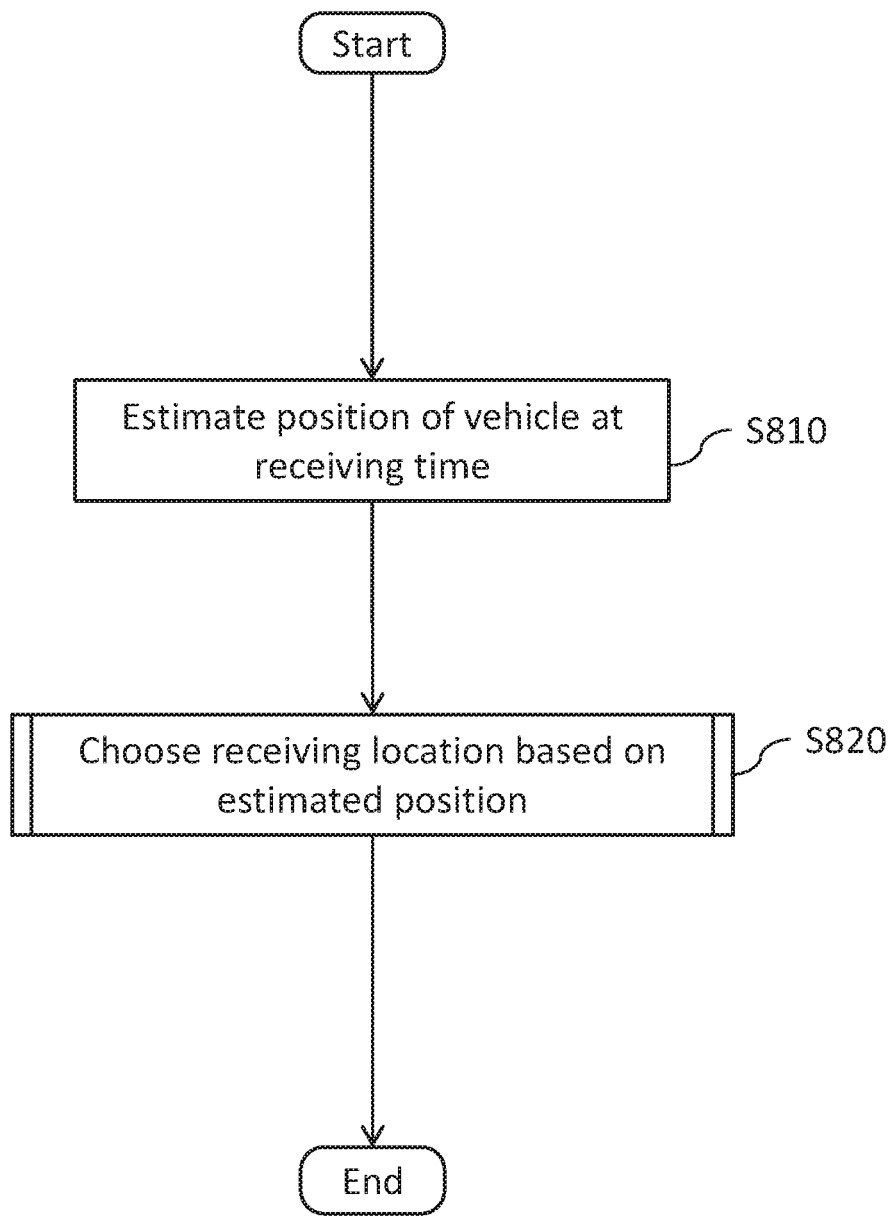
FIG. 8 shows an example operational flow of step S720 in FIG. 7.

FIG. 8 shows an example operational flow of step S720 in FIG. 7. First, the apparatus 100 estimates the position of the vehicle containing the user's communication device (first communication device) at the receiving time indicated by the first signal (S810). In the specific example of the order associated with DriverID1 shown in the example of the order data storage 120 shown in FIG. 2, whose corresponding moving route is stored in the moving route data storage 130 shown in FIG. 3, the position estimating section 141 may estimate where, along the moving route, the vehicle will be at the receiving time of 11:45.

Next, the apparatus 100 chooses the receiving location of the requested product or service based on the estimated position (S820). For example, the receiving location choosing section 142 may reference the store data storage 150 and determine the receiving location based on the position data and delivery radius of each store offering the requested product or service. To continue with the specific example of the order associated with DriverID1, the receiving location choosing section 142 may choose StoreID1 to be the receiving location based on a comparison between the estimated position of the vehicle and the position data of stores offering hamburgers. (Note that "stores offering hamburgers" may refer to stores offering a specific brand hamburger item rather than hamburgers generally, i.e. locations of a specific hamburger chain named in the first signal transmitted from the first communication device.)

Figure 9:
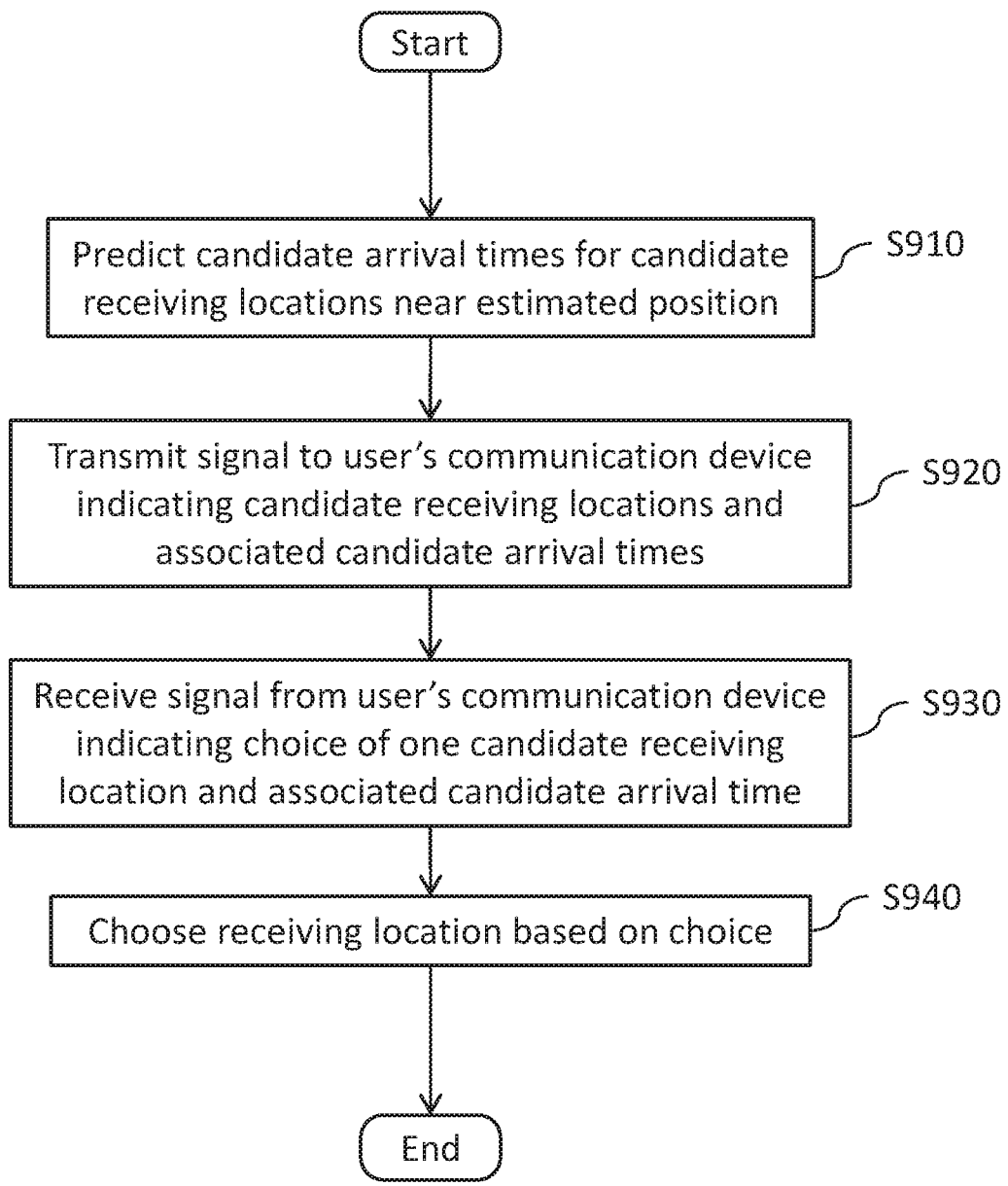
FIG. 9 shows an example operational flow of step S820 in FIG. 8.

FIG. 9 shows an example operational flow of step S820 in FIG. 8. The example of FIG. 9 is an optional process in which the user can choose the receiving location from candidate receiving locations. After the position of the vehicle at the receiving time has been estimated in step S810, the apparatus 100 predicts candidate arrival times for candidate receiving locations near the estimated position (S910). Continuing with the specific example of DriverID1, candidate receiving locations may include StoreID1 (shown in FIG. 4), StoreID3 (not shown), and StoreID4 (not shown). These receiving locations may be candidates because they offer the requested product or service. For example, they may be locations of a hamburger chain offering the requested hamburger. Moreover, these receiving locations may be candidates because they are nearby stores offering the requested product or service. For example, the candidate receiving locations may include all stores (and/or delivery sites accessible by stores) offering the requested product or service within a particular area window or distance range of the estimated position. For each of the candidate receiving locations, the arrival time predicting section 143 may predict a candidate arrival time. In some cases, none of the predicted candidate arrival times will exactly match the originally requested receiving time. Some may fall before while others may fall after the receiving time.

Next, the apparatus 100, e.g. the vehicle I/O section 110, transmits a third signal to the first communication device, the third signal indicating the plurality of candidate receiving locations and associated candidate predicted arrival times (S920). The candidate receiving locations and associated candidate predicted arrival times may be presented by the first communication device to the user by any presentation means (e.g. visual, audio, etc.). For example, if the originally requested receiving time was 11:45, the user may be presented with three locations associated with arrival times of 11:22, 11:36, and 12:05, respectively.

After the user has chosen a pair of candidate receiving location and candidate predicted arrival time by any input device, e.g. mouse input, keyboard input, touch screen input, eye tracking input, voice commands, and/or gestures, the first communication device transmits the choice to the apparatus 100. Thus, the apparatus 100, e.g. the vehicle I/O section 110, receives a fourth signal originating from the first communication device, the fourth signal indicating a choice of one of the candidate receiving locations and associated candidate predicted arrival times (S930).

Finally, the apparatus 100 determines the receiving location based on the choice indicated by the fourth signal (S940). For example, the receiving location choosing section 142 may choose StoreID1 to be the receiving location for the order associated with DriverID1 based on the choice made by DriverID1 of this candidate receiving location and its associated candidate predicted arrival time. The determining section 140 then inserts StoreID1 in the order data associated with DriverID1 in the order data storage 120. For the sake of example, let us assume that the candidate predicted arrival time associated with StoreID1 is 11:36 and that DriverID1 chooses this receiving location and predicted arrival time. In such a case, after step S940, the operation flow of FIG. 7 continues to step S730 and the original receiving time of 11:45 stored in the order data storage 120 is updated to 11:36 based on the predicted arrival time.

Figure 10:
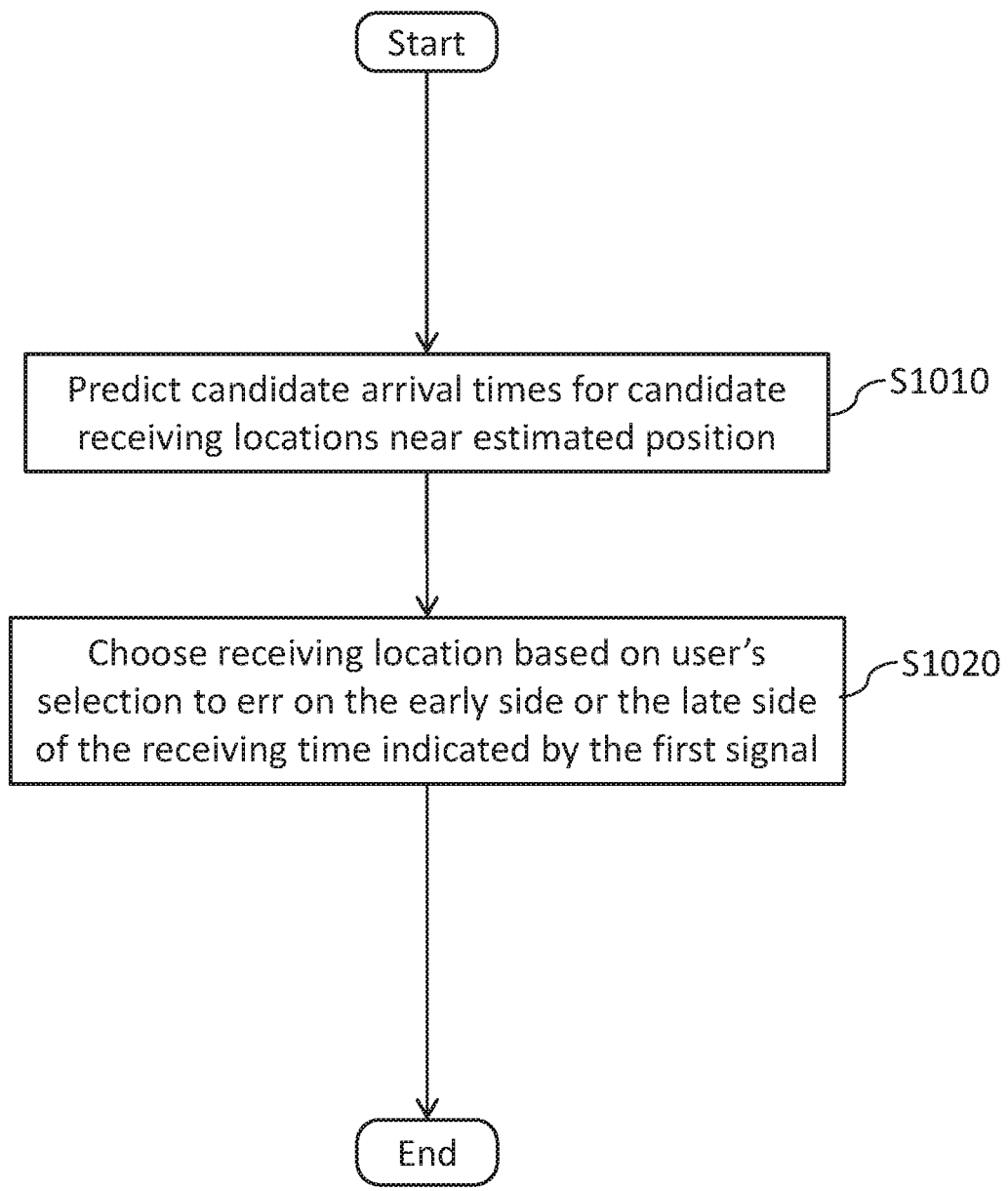
FIG. 10 shows an alternative example operational flow of step S820 in FIG. 8.

FIG. 10 shows an alternative example operational flow of step S820 in FIG. 8. The example in FIG. 10 is a process in which the user need not choose the receiving location from candidate receiving locations. After the position of the vehicle at the receiving time has been estimated in step S810, the apparatus 100 predicts candidate arrival times for candidate receiving locations near the estimated position (S1010) in the same way as in the operational flow of FIG. 9. However, instead of transmitting a third signal indicating the plurality of candidate receiving locations and associated candidate predicted arrival times as in the operational flow of FIG. 9, the apparatus chooses the receiving location based on the user's selection to err on the early side or the late side of the receiving time indicated by the first signal (S1020). As explained above, the first signal may further indicate a selection between erring on the side of completing the preparation of the requested product or service before the receiving time and erring on the side of completing the preparation of the requested product or service after the receiving time. Instead of, or in addition to, using this information to modify the receiving time or to determine the specified time as described above, the information of the user's selection may be used to determine the receiving location. Thus, to continue with the specific example of DriverID1 and the three candidate receiving locations associated with candidate arrival times of 11:22, 11:36, and 12:05, respectively, the receiving location choosing section 142 may refer to the timing preference selection of "Err Early" stored in the order data storage 120 in association with DriverID1 and choose 11:36 on this basis. One example algorithm arriving at this result may be to choose the candidate arrival time that is nearest to the original receiving time (11:45) out of those on the early side (for "Err Early"), out of those on the late side (for "Err Late"), or out of all candidate arrival times (for Timing Preference of "None" or "Exactly"). The timing preference of "None" or "Exactly" may cause the receiving location choosing section 142 to choose the arrival time that is closest to the receiving time among all candidate arrival times irrespective of whether the candidate arrival time is on the early side or the late side. In this way, the receiving location choosing section 142 may choose StoreID1 to be the receiving location based on the user's selection to err on the early side of the receiving time. The determining section 140 then inserts StoreID1 in the order data associated with DriverID1 in the order data storage 120. For the sake of example, let us assume that the candidate predicted arrival time associated with StoreID1 is 11:36 and that the receiving location choosing section 142 chooses this receiving location and predicted arrival time based on the user's timing preference selection by an algorithm such as the above algorithm. In such a case, after step S1020, the operation flow of FIG. 7 continues to step S730 and the original receiving time of 11:45 stored in the order data storage 120 is updated to 11:36 based on the predicted arrival time.

Figure 11:
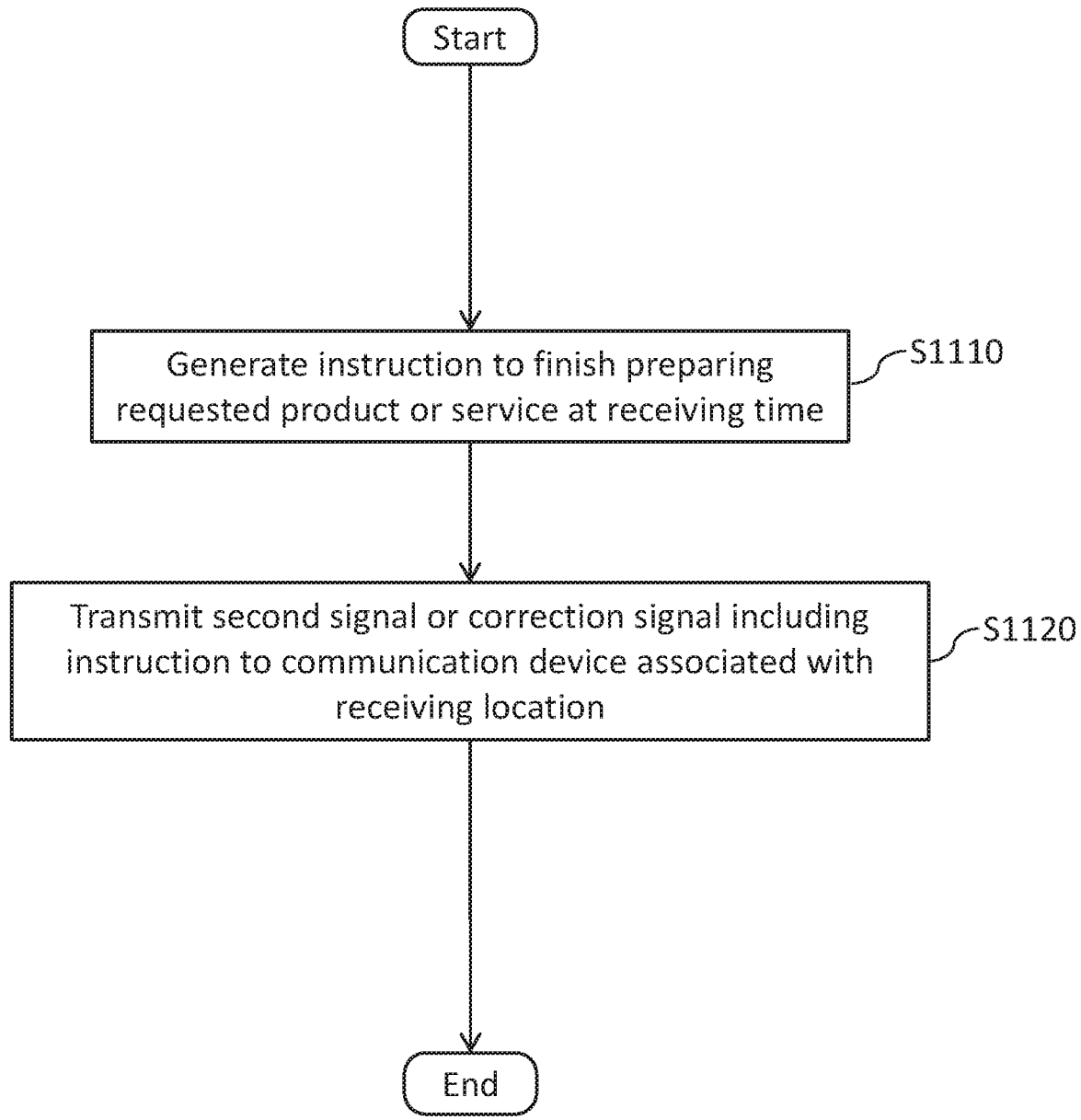
FIG. 11 shows an example operational flow of step S740 in FIG. 7.

FIGS. 11-14 show example operational flows of step S740 in FIG. 7. At this point in the operational flow of FIG. 7, a receiving location has been determined for an order and the receiving time has been updated based on the predicted arrival time at the receiving location. Thus, the order data storage 120 includes an entry for the receiving location and, for the sake of example, let us assume that the receiving time shown in the order data storage 120 in FIG. 2 reflects any update that has been made in step S730. In the example of FIG. 11, the apparatus 100 generates an instruction to finish preparing the requested product or service at the receiving time (S1110), and then the apparatus 100 transmits a second signal or correction signal including the generated instruction to a communication device associated with the receiving location (S1120). In the specific example of DriveID1, the instruction generating section 191 of the store I/O section 190 may reference the order data storage 120 and, referring to the order associated with DriverID1, generate an instruction to finish preparing a hamburger (requested product or service) at 11:45 (receiving time) for DriverID1 (driver). The store I/O section 190 may then transmit a signal including such instruction (second signal, or correction signal if new receiving time) to the second communication device associated with StoreID1 (receiving location).

Figure 12:
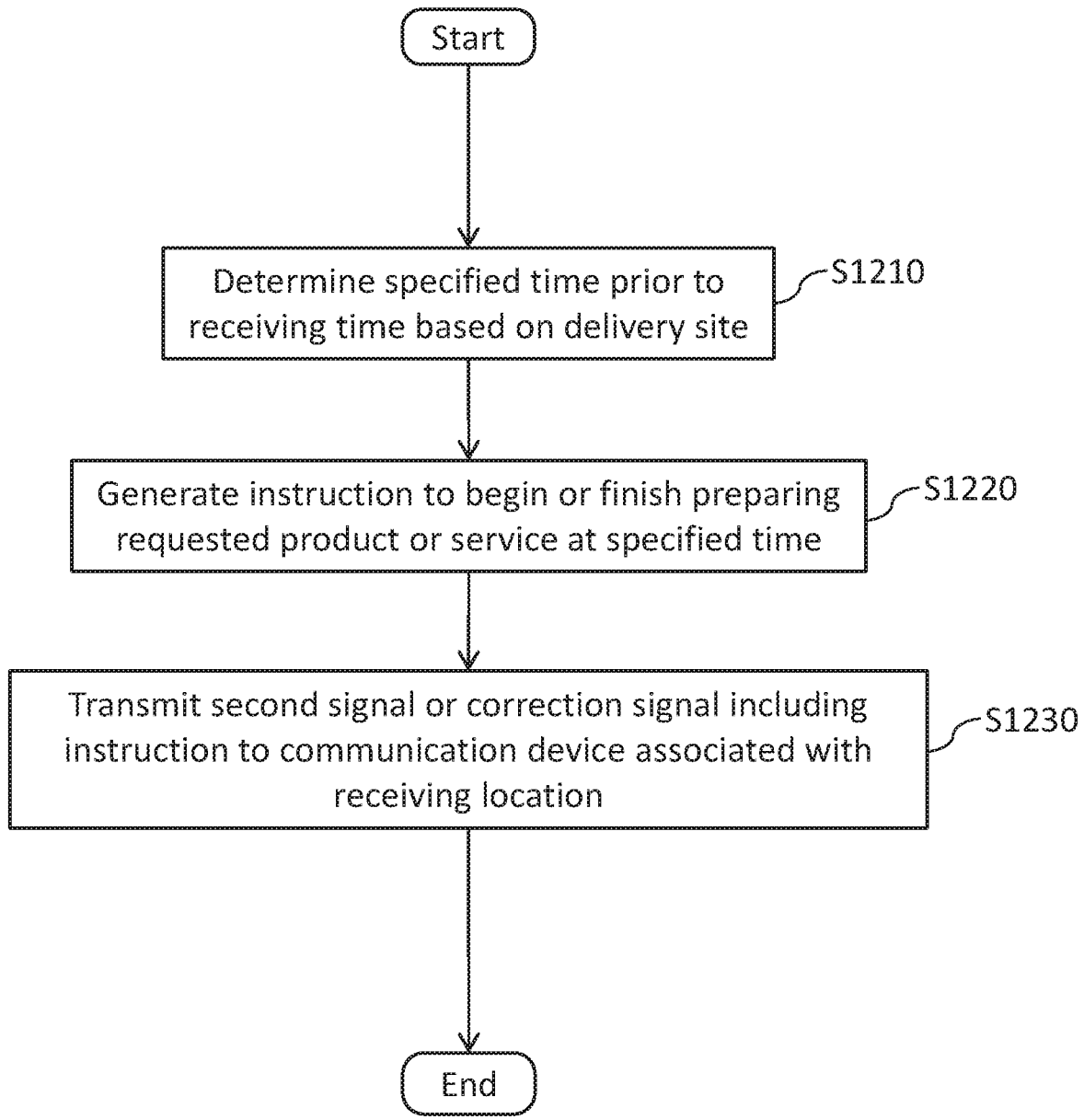
FIG. 12 shows an alternative example operational flow of step S740 in FIG. 7.

FIG. 12 shows an alternative example operational flow of step S740 in FIG. 7. In the example of FIG. 12, the receiving location is a delivery site. The apparatus 100 determines a specified time prior to the receiving time based on the delivery site (S1210), generates an instruction to begin or finish preparing the requested product or service at the specified time (S1220), and transmits a signal including such instruction (second signal, or correction signal if new receiving time) to a communication device associated with the receiving location (S1230). As a specific example, the instruction generating section 191 of the store I/O section 190 may reference the order data storage 120 and the delivery route data storage 170 and, referring to the order associated with DriverID3, generate an instruction to finish preparing a smoothie (requested product or service) at 11:40 (specified time equals receiving time of 11:50 minus delivery time of 10 minutes determined based on route data and traffic/weather data) for delivery to DeliverySiteID1 (receiving location) for DriverID3 (driver). The store I/O section 190 may then transmit a signal including such instruction (second signal, or correction signal if new receiving time) to the second communication device associated with StoreID2 (store determined along with determining delivery site as receiving location).

Figure 13:
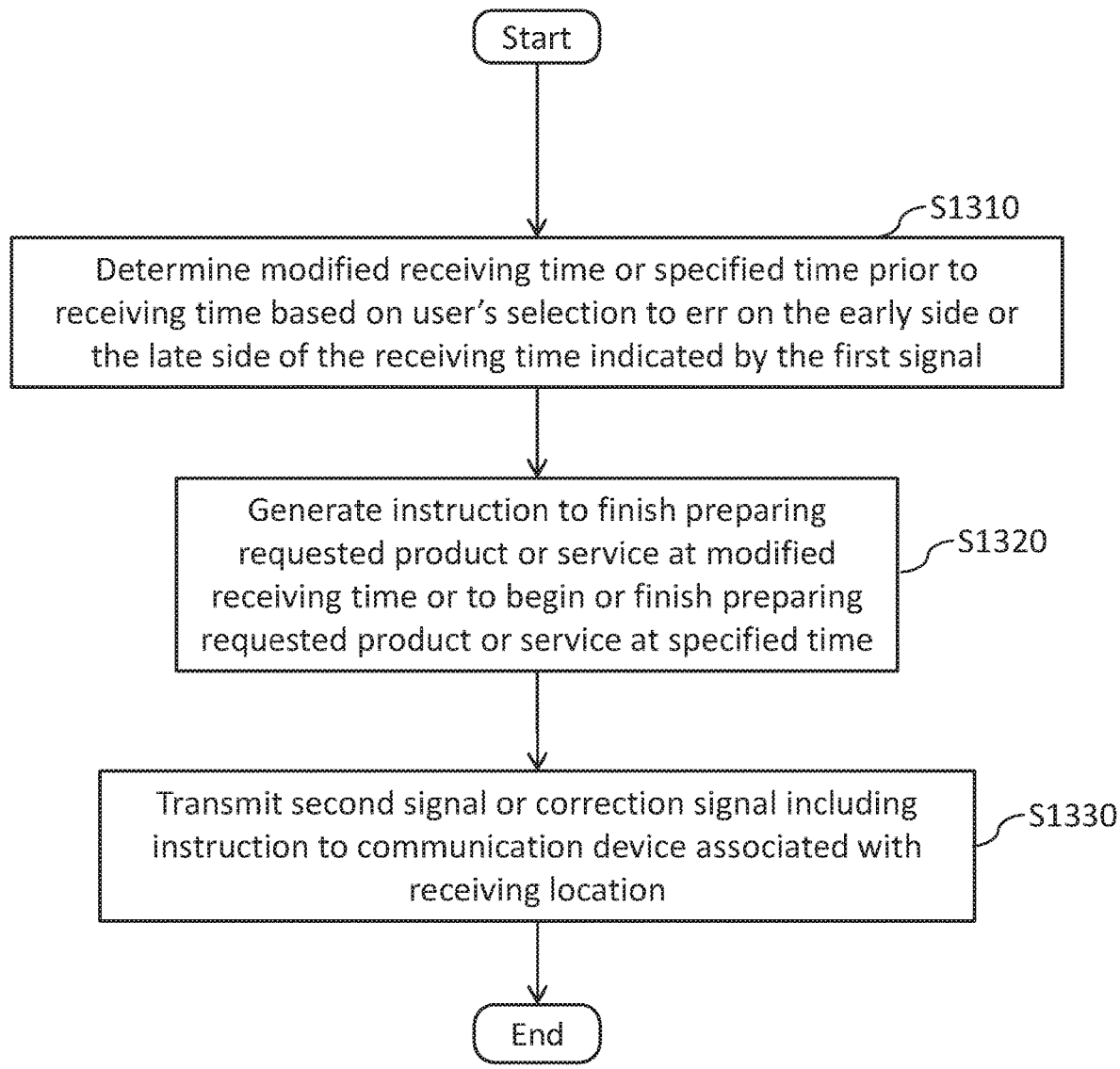
FIG. 13 shows an alternative example operational flow of step S740 in FIG. 7.

FIG. 13 shows an alternative example operational flow of step S740 in FIG. 7. In the example of FIG. 13, the first signal originating from the first communication device further indicates a selection between erring on the side of completing the preparation of the requested product or service before the receiving time and erring on the side of completing the preparation of the requested product or service after the receiving time. In the specific example of DriveID1, FIG. 2 shows that a timing preference selection of "Err Early" has been stored in the order data storage 120 (e.g. by the vehicle I/O section 110) in association with DriverID1. The apparatus 100 determines a modified receiving time or a specified time prior to the receiving time based on the user's selection to err on the early side or the late side of the receiving time indicated by the first signal (S1310), generates an instruction to finish preparing the requested product or service at the modified receiving time or to begin or finish preparing the requested product or service at the specified time (S1320), and transmits a signal including such instruction (second signal, or correction signal if new receiving time) to a communication device associated with the receiving location (S1330). To continue with the specific example of DriverID1, the instruction generating section 191 of the store I/O section 190 may reference the order data storage 120 and, referring to the order associated with DriverID1, determine a modified receiving time of 11:42 based on the user's selection (e.g. modified receiving time equals receiving time of 11:45 minus standard modifier, e.g. 3 minutes) and generate an instruction to finish preparing a hamburger (requested product or service) at 11:42 (modified receiving time) for DriverID1 (driver). Similarly, the instruction generating section 191 of the store I/O section 190 may reference the order data storage 120 and, referring to the order associated with DriverID1, determine a specified time of 11:42 based on the user's selection (specified time equals receiving time of 11:45 minus standard shift, e.g. 3 minutes) and generate an instruction to begin or finish preparing a hamburger (requested product or service) at 11:42 (specified time) for Driver ID1 (driver). The store I/O section 190 may then transmit a signal including such instruction (second signal, or correction signal if new receiving time) to the second communication device associated with StoreID1 (receiving location). If the timing preference selection is used in this way, the user's selection to "Err early" may indicate a preference for timeliness, while the user's selection to "Err late" may indicate a preference for freshness.

Figure 14:
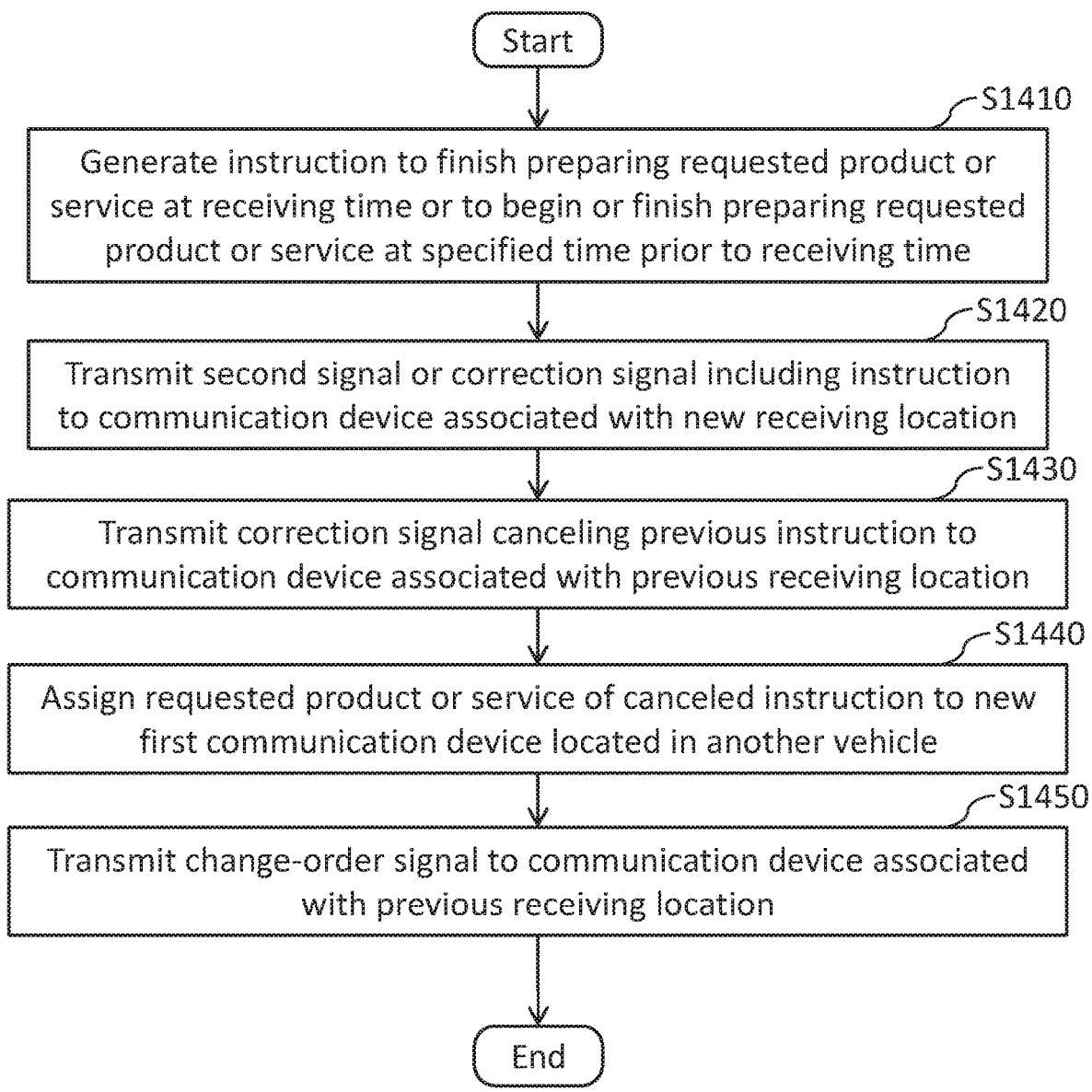
FIG. 14 shows an alternative example operational flow of step S740 in FIG. 7.

FIG. 14 shows an alternative example operational flow of step S740 in FIG. 7. The operational flow of FIG. 14 focuses on a situation in which a new receiving location has been determined for an order after a second signal has already been transmitted to a previous receiving location for the same order. In other words, the operational flow of FIG. 14 represents the second or later occurrence of step S740, after there has been at least one loopback in FIG. 7 ("Yes" at step S750). First, the apparatus 100 generates an instruction to finish preparing the requested product or service at the receiving time or to begin or finish preparing the requested product or service at a specified time prior to the receiving time (S1410). Since FIG. 14 focuses on a change in the receiving location, the details of how the instruction of step S1410 is generated are not shown in FIG. 14. However, the instruction may be generated using any of the methods and criteria shown in FIGS. 11-13 or described elsewhere or a combination thereof (e.g. based on a user's timing preference selection, delivery site, and/or preparation time, etc.). The apparatus 100 then transmits a second signal or correction signal including the instruction to a communication device associated with the new receiving location. (If the new receiving location was not newly determined in the most recent occurrence of step S720, e.g. if the most recent loop of FIG. 7 only resulted in an updated to the receiving time, it will be a correction signal.) Thus, in a case where the determining section 140 determines the receiving location based on a traffic or weather condition of the moving route, the determining section 140 may, prior to step S1410 (i.e. in a prior occurrence of step S720), determine a new receiving location of the requested product or service based on a change in the traffic or weather condition of the moving route, and the vehicle I/O section may, in step S1420, transmit a new second signal to a second communication device associated with the determined new receiving location, the new second signal indicating an instruction to prepare the requested product or service. As a specific example of steps S1410 and S1420, the instruction generating section 191 may generate an instruction to finish preparing a hamburger (requested product or service) at 11:45 (receiving time) for DriverID1 (driver), and the vehicle I/O section 190 may transmit a signal including such instruction (second signal, or correction signal if new receiving time) to the second communication device associated with StoreID1 (new receiving location). For the sake of this example, let us assume that the example of the order data storage 120 shown in FIG. 2 has already been updated to include the new receiving location for the order associated with DriverID1.

Next, the apparatus 100 transmits a correction signal to the second communication device that received the previous second signal for the order, the correction signal indicating that the instruction of the second signal is canceled (S1430). To continue with the specific example, let us assume that the receiving location of the order associated with DriverID1 was previously determined to be StoreID3 (not shown) and the second communication device associated with StoreID3 received the previous second signal or correction signal indicating an instruction to prepare a hamburger. In this case, the vehicle I/O section 190 may transmit a correction signal to the second communication device associated with StoreID3 canceling the previous instruction to prepare the hamburger. While not specifically illustrated, there are many ways that the apparatus 100 can keep track of previous receiving locations in this way. For example, the order data storage 120 may include a field for previous receiving location, and the determining section 140 may copy the data from the receiving location field to the previous receiving location field when updating the receiving location field. Alternatively, the vehicle I/O section 190 may keep a record of sent instructions or second signals, and when a new second signal will contradict a previously sent instruction or second signal, the I/O section 190 may generate the correction signal canceling the previous instruction on this basis.

If preparation of the requested product or service had already begun as a result of the previous instruction, canceling the previous instruction need not always result in a waste of that preparation time and materials/ingredients. When the order data storage 120 is relatively large, there may be many similar orders that may be interchangeable. Therefore, in some cases, the apparatus 100 assigns the requested product or service of the instruction canceled by the correction signal to a new first communication device located in another vehicle (S1440). In the simplest case, the exact same product or service, e.g. a hamburger, has been requested by the new first communication device, e.g. DriverID5 (not shown), with the same receiving time. Rather than waste the preparation time and ingredients of the first hamburger, the hamburger is simply assigned to the order associated with DriverID5, e.g. by the determining section 140 or vehicle I/O section 190 updating the order data storage 120. In this case, the apparatus 100, e.g. the vehicle I/O section 190, may transmit a change-order signal to the communication device of the previous receiving location (which received the correction signal canceling the order, or simultaneously with or as part of the correction signal canceling the order), the change-order signal indicating an instruction to finish preparing the hamburger (requested product or service) for DriverID5 (new first communication device) at the receiving time or to begin, continue, or finish the preparation of the hamburger (requested product or service) for DriverID5 (new first communication device) at a specified time prior to the receiving time. As a more complicated example, a modified version of the product or service, e.g. a cheeseburger in the case where the original instruction was to prepare a hamburger, has been requested by the new first communication device, e.g. DriverID2, perhaps with a different but similar receiving time. In this case, the hamburger may be converted to a cheeseburger and assigned to the order associated with the new first communication device (DriverID2), e.g. by the determining section 140 or vehicle I/O section 190 updating the order data storage 120. The apparatus 100, e.g. the vehicle I/O section 190, may then transmit a change-order signal to the communication device of the previous receiving location (which received the correction signal canceling the order, or simultaneously with or as part of the correction signal canceling the order), the change-order signal indicating an instruction to finish preparing a cheeseburger (modified version of the requested product or service) at 11:50 (second receiving time associated with new first communication device, i.e. DriverID2) or to begin, continue, or finish the preparation of a cheeseburger (modified version of the requested product or service) at a second specified time prior to 11:50 (second receiving time associated with new first communication device, i.e. DriverID2). Thus, the apparatus 100 may transmit a change-order signal to the second communication device that receives the correction signal, the change-order signal indicating an instruction to finish preparing the requested product or service or a modified version of the requested product or service at a second receiving time associated with the new first communication device or to begin, continue, or finish the preparation of the requested product or service or a modified version of the requested product or service at a second specified time prior to the second receiving time (S1450).

The order of the steps shown in FIG. 14 is only one example. The second signal or correction signal may be transmitted to the new receiving location before or after the correction signal and/or change-order signal is transmitted to the previous receiving location. Also, the transmitting of the correction signal canceling the previous instruction and the change-order signal may be accomplished by a single signal or by separate signals in either order, provided that the correction signal does not result in destruction of the materials or ingredients associated with the half-prepared product or service before the change-order signal or a warning of the change-order signal can be received.

Figure 15:
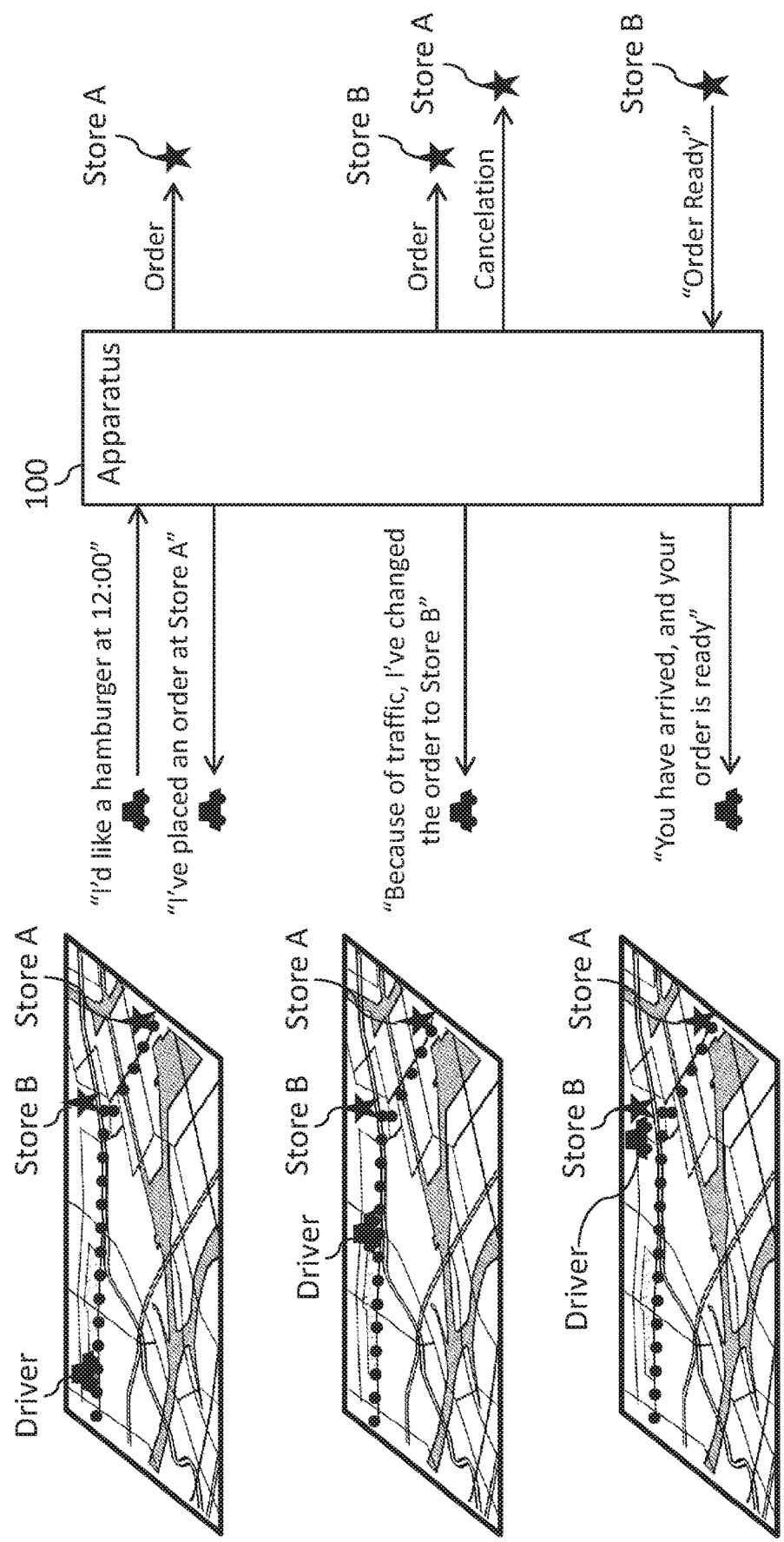
FIG. 15 shows a usage example of an apparatus in accordance with an embodiment.

FIG. 15 shows a usage example of the apparatus 100. On the left side, depicted from top to bottom in chronological order, are three states of a driver of a vehicle traveling along a moving route (dotted line) in relation to stores A and B (stars). On the right side, depicted from top to bottom in chronological order aligned with and corresponding to the three states, are input and output signals of the apparatus 100. At the time of the first, topmost state, the driver says or otherwise communicates to the first communication device, "I'd like a hamburger at 12:00." Based on this communication, the apparatus 100 receives a first signal including an indication of the requested product or service (hamburger), the receiving time (12:00), and the moving route of the vehicle. After determining the receiving location to be Store A, the apparatus 100 transmits a second signal to a second communication device associated with Store A, thereby placing an order at Store A. The apparatus 100 then communicates to the driver, via the first communication device, "I've placed an order at Store A."

A little later, at the time of the second, middle state, there has been a change in traffic conditions along the moving route of the driver. Based on moving route data updates by the first communication device and/or traffic conditions received from another server, the apparatus 100 re-determines the receiving location to be Store B and transmits a second signal to a second communication device associated with Store B, thereby placing an order at Store B. The apparatus 100 then communicates to the driver, via the first communication device, "Because of traffic, I've changed the order to Store B" (the apparatus 100 may further cause the first communication device to display a map showing Store B, for example), and transmits a correction signal canceling the original order to the second communication device associated with Store A.

Having been informed of the change to Store B, the driver arrives at Store B at the time of the third, bottom-most state. At around the same time, e.g. moments before, the apparatus 100 receives a signal originating from the second communication device associated with Store B indicating that the order is ready. As the driver arrives at Store B, the apparatus 100 communicates to the driver, via the first communication device, "You have arrived, and your order is ready."

Figure 16:
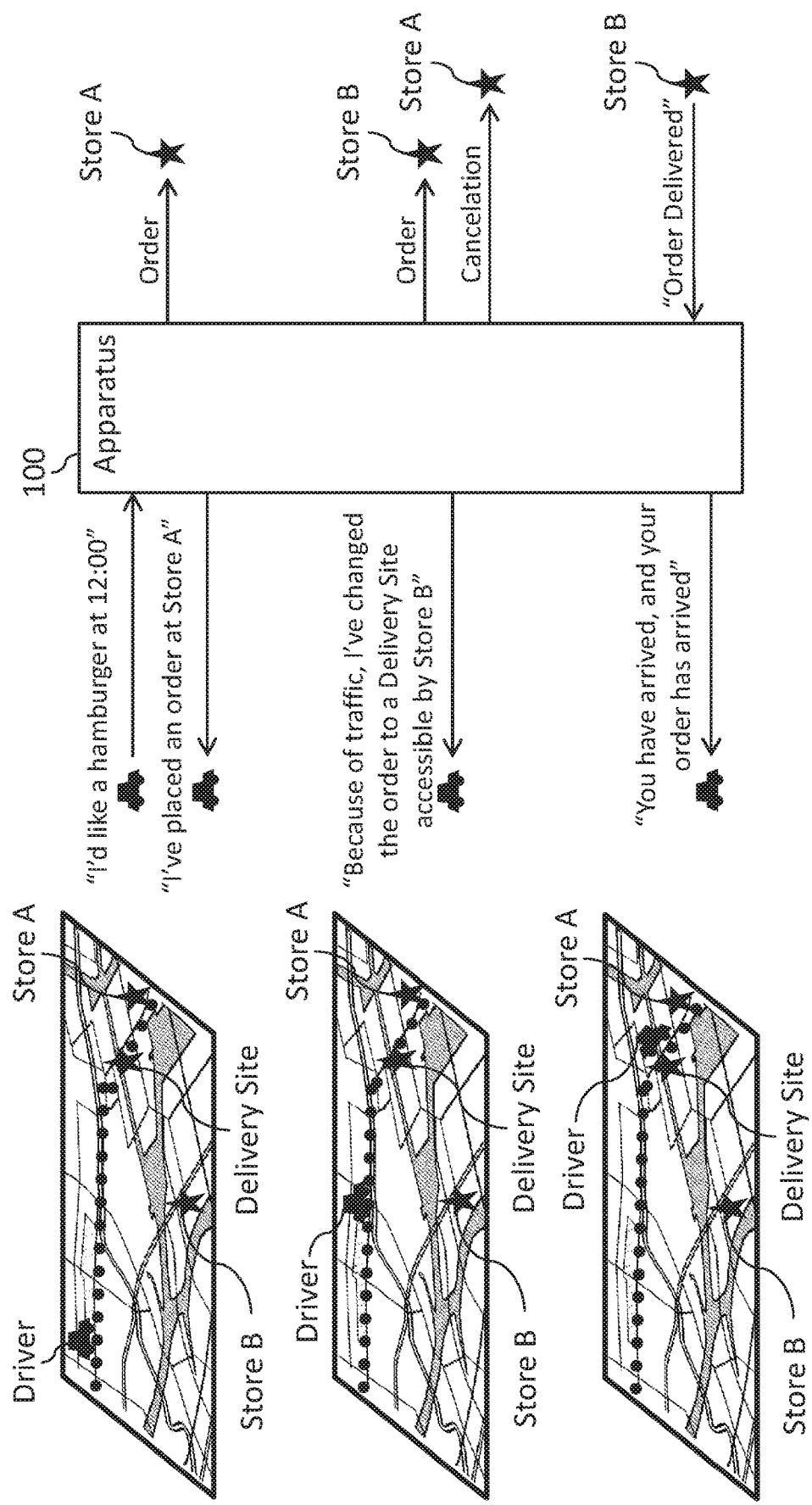
FIG. 16 shows another usage example of an apparatus in accordance with an embodiment.
Figure 17:
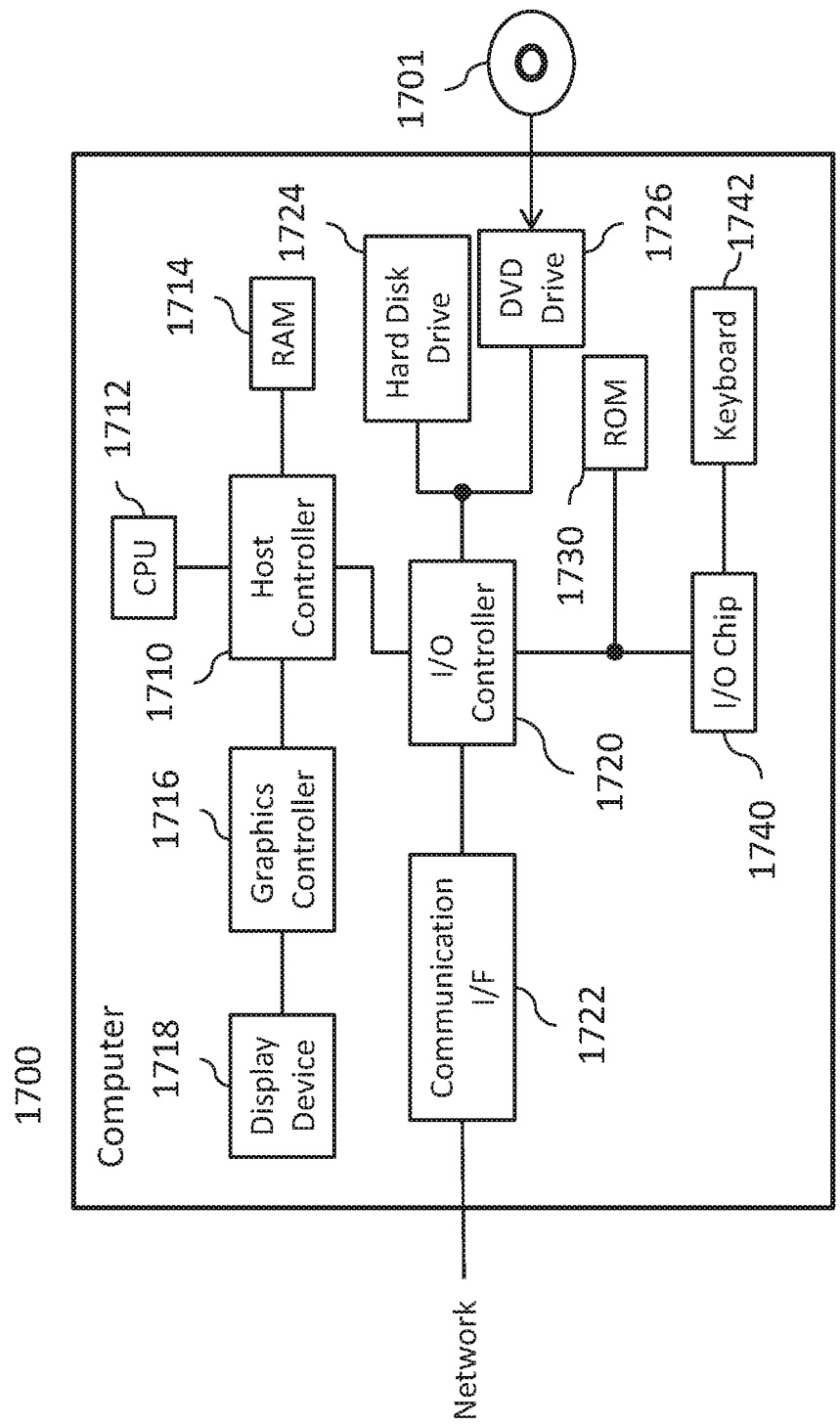
FIG. 17 shows an example of a computer in which the apparatus, the operational flow of FIG. 7, and/or other embodiments of the claimed invention may be wholly or partly embodied.

FIG. 16 shows another usage example of the apparatus 100. On the left side, depicted from top to bottom in chronological order, are three states of a driver of a vehicle traveling along a moving route (dotted line) in relation to stores A and B and a delivery site (stars). On the right side, depicted from top to bottom in chronological order aligned with and corresponding to the three states, are input and output signals of the apparatus 100. At the time of the first, topmost state, the driver says or otherwise communicates to the first communication device, "I'd like a hamburger at 12:00." Based on this communication, the apparatus 100 receives a first signal including an indication of the requested product or service (hamburger), the receiving time (12:00), and the moving route of the vehicle. After determining the receiving location to be Store A, the apparatus 100 transmits a second signal to a second communication device associated with Store A, thereby placing an order at Store A. The apparatus 100 then communicates to the driver, via the first communication device, "I've placed an order at Store A." Up until this point, the example in FIG. 16 is the same as the example in FIG. 15.

A little later, at the time of the second, middle state, there has been a change in traffic conditions along the moving route of the driver. Unlike the example in FIG. 15, this time there is no conveniently located Store B along the moving route. Instead, Store B is much farther off and would require a significant detour. However, the apparatus 100 has information of a delivery site accessible to Store B that is on the moving route. Meanwhile, Store A may not offer delivery to the same delivery site. Therefore, based on moving route data updates by the first communication device and/or traffic conditions received from another server, the apparatus 100 re-determines the receiving location to be the delivery site accessible by Store B and transmits a second signal to a second communication device associated with Store B, thereby placing an order at Store B with instructions indicating the delivery site (e.g. including preparation start time taking into account the delivery time). The apparatus 100 then communicates to the driver, via the first communication device, "Because of traffic, I've changed the order to a Delivery Site accessible by Store B" (the apparatus 100 may further cause the first communication device to display a map showing the delivery site, for example), and transmits a correction signal canceling the original order to the second communication device associated with Store A.

Having been informed of the change to the delivery site accessible by Store B, the driver arrives at the delivery site at the time of the third, bottom-most state. At around the same time, e.g. moments before, the apparatus 100 receives a signal originating from the second communication device associated with Store B indicating that the order has been delivered to the delivery site. As the driver arrives at the delivery site, the apparatus 100 communicates to the driver, via the first communication device, "You have arrived, and your order has arrived."

In the example of the apparatus 100 described with respect to FIGS. 1-16, the timing preference stored in the order data storage 120 (e.g. "Err Early," etc.) is used both for determining the receiving location according to the operational flow of FIG. 10 and for determining a modified receiving time or specified time according to the operational flow of FIG. 13. However, the apparatus 100 may instead make use of two distinct selections (e.g. selections included in the first signal originating from the first communication device and stored in the order data storage 120), one for use in an algorithm to choose between candidate receiving locations and one for use in determining when the order should be completed relative to the receiving time. In this case, the first such selection might indicate the user's general preference about the receiving time while the second such selection might indicate a freshness or timeliness preference.

In the example of the apparatus 100 described with respect to FIGS. 1-16, it is generally assumed that the preparation time of the requested product or service is shorter than the time it will take for the user of the first communication device to arrive at the receiving location. However, the apparatus 100 may also include functionality for the circumstance where the user is "too close" to the receiving location. For example, when determining the receiving location, the determining section 140, e.g. the arrival time predicting section 143, may further take into account the preparation time for the requested product or service stored in the store data storage 150. When the preparation time indicates that preparation will be completed later than the predicted arrival time, the determining section 140 may update the receiving time in the order data storage 120 base on the preparation time. For example, the determining section 140 may update the receiving time in the order data storage 120 by replacing it with an estimated completion time equal to the current time plus the preparation time, or a later time including some buffer time. The determining section 140 may then notify the user of the first communication device 110 of the change to the receiving time, informing the user that it is necessary to delay pickup.

In the example of the apparatus 100 described with respect to FIGS. 1-16, orders are organized by DriverID, which suggests that only one active order can exist per driver. However, the invention is not limited to this. For example, orders may be organized by order, e.g. by OrderID, rather than by driver. In this case, multiple active orders may be associated with a single driver (e.g. a driver may want to stop for lunch at one time and stop for vehicle servicing at another time). The various data storages and the functions of the vehicle I/O section 110, determining section 140, and store I/O section 190 can be adjusted accordingly.

As can be understood from this disclosure, the features of the apparatus 100 make it possible to avoid the drawbacks associated with conventional systems. Since, in the apparatus 100, the receiving location is determined based on the receiving time and moving route indicated by the first signal, it is possible to control when the coincidence of the arrival time and the food preparation time occurs, even in the case of unexpected weather or traffic conditions. Thus, the apparatus 100 can help avoid the situation where the arrival time and food preparation time coincide but are too early or too late. Moreover, by providing flexibility in the determined receiving location, including, for example, delivery sites located on or near the moving route, it is possible to minimize the delay associated with leaving the driver's intended route. In these ways, the apparatus 100 may assist the user of the first communication device (e.g. the driver of the vehicle) in placing an order at a receiving location for optimal delivery, resulting in reduced fuel consumption of the user's vehicle and reduced negative societal impact of traffic due to minimized detours, in addition to time efficiency and psychological benefits. Furthermore, in comparison to conventional hardware and/or software systems with related aims, the efficiency gains of the apparatus 100 allow for more efficient system architecture and use of system resources (memory, processor load, etc.).

FIG. 15 shows an example of a computer 1700 in which the apparatus 100, the operational flow of FIG. 7, and/or other embodiments of the claimed invention may be wholly or partly embodied. The computer 1700 according to the present embodiment includes a CPU 1712, a RAM 1714, a graphics controller 1716, and a display device 1718, which are mutually connected by a host controller 1710. The computer 1700 also includes input/output units such as a communication interface 1722, a hard disk drive 1724, and a DVD-ROM drive 1726, which are connected to the host controller 1710 via an input/output controller 1720. The computer also includes legacy input/output units such as a ROM 1730 and a keyboard 1742, which is connected to the input/output controller 1720 through an input/output chip 1740.

The host controller 1710 connects the RAM 1714 with the CPU 1712 and the graphics controller 1716, which access the RAM 1714 at a high transfer rate. The CPU 1712 operates according to programs stored in the ROM 1730 and the RAM 1714, thereby controlling each unit. The graphics controller 1716 obtains image data generated by the CPU 1712 on a frame buffer or the like provided in the RAM 1714, and causes the image data to be displayed on the display device 1718. Alternatively, the graphics controller 1716 may contain therein a frame buffer or the like for storing image data generated by the CPU 1712.

The input/output controller 1720 connects the host controller 1710 with the communication interface 1722, the hard disk drive 1724, and the DVD-ROM drive 1726, which are relatively high-speed input/output units. The communication interface 1722 communicates with other electronic devices via a network. The hard disk drive 1724 stores programs and data used by the CPU 1712 within the computer 1700. The DVD-ROM drive 1726 reads the programs or the data from the DVD-ROM 1701, and provides the hard disk drive 1724 with the programs or the data via the RAM 1714.

The ROM 1730 and the keyboard 1742 and the input/output chip 1740, which are relatively low-speed input/output units, are connected to the input/output controller 1720. The ROM 1730 stores therein a boot program or the like executed by the computer 1700 at the time of activation, a program depending on the hardware of the computer 1700. The keyboard 1742 inputs text data or commands from a user, and may provide the hard disk drive 1724 with the text data or the commands via the RAM 1714. The input/output chip 1740 connects the keyboard 1742 to the input/output controller 1720, and may connect various input/output units via a parallel port, a serial port, a keyboard port, a mouse port, and the like to the input/output controller 1720.

A program to be stored on the hard disk drive 1724 via the RAM 1714 is provided by a recording medium such as the DVD-ROM 1701 or an IC card. The program is read from the recording medium, installed into the hard disk drive 1724 within the computer 1700 via the RAM 1714, and executed in the CPU 1712.

A program that is installed in the computer 1700 can cause the computer 1700 to function as an apparatus such as the apparatus 100 of FIG. 1. Such a program may act on the CPU 1712 to cause the computer 1700 to function as some or all of the sections, components, elements, databases, etc. of the apparatus 100 of FIG. 1 (e.g., the determining section 140, the vehicle I/O section 190, etc.).

A program that is installed in the computer 1700 can also cause the computer 1700 to perform an operational flow such as the operational flow of FIG. 7. Such a program may act on the CPU 1712 to cause the computer 1700 to perform some or all of the steps of FIG. 7 (e.g., determine receiving location S720, transmit second signal and/or correction signal S740, etc.).

The information processing described in these programs is read into the computer 1700, resulting in the cooperation between a program and the above-mentioned various types of hardware resources. An apparatus or method may be constituted by realizing the operation or processing of information in accordance with the usage of the computer 1700.

For example, when communication is performed between the computer 1700 and an external device, the CPU 1712 may execute a communication program loaded onto the RAM 1714 to instruct communication processing to the communication interface 1722, based on the processing described in the communication program.

The communication interface 1722, under control of the CPU 1712, reads transmission data stored on a transmission buffering region provided in a recording medium such as the RAM 1714, the hard disk drive 1724, or the DVD-ROM 1701, and transmits the read transmission data to a network or writes reception data received from a network to a reception buffering region or the like provided on the recording medium. In this way, the communication interface 1722 may exchange transmission/reception data with a recording medium by a DMA (direct memory access) method or by a configuration in which the CPU 1712 reads the data from the recording medium or the communication interface 1722 of a transfer destination and writes the data into the communication interface 1722 or the recording medium of the transfer destination, so as to transfer the transmission/reception data.

In addition, the CPU 1712 may cause all or a necessary portion of a file or a database to be read into the RAM 1714 such as by DMA transfer, the file or the database having been stored in an external recording medium such as the hard disk drive 1724, the DVD-ROM drive 1726 (DVD- ROM 1701) and perform various types of processing on the data on the RAM 1714. The CPU 1712 may then write back the processed data to the external recording medium by means of a DMA transfer method or the like. In such processing, the RAM 1714 can be considered to temporarily store the contents of the external recording medium, and so the RAM 1714, the external recording apparatus, and the like are collectively referred to as a memory, a storage section, a recording medium, a computer readable medium, etc.

Various types of information, such as various types of programs, data, tables, and databases, may be stored in the recording apparatus to undergo information processing. Note that the CPU 1712 may also use a part of the RAM 1714 to perform reading/writing thereto on a cache memory. In such an embodiment, the cache is considered to be contained in the RAM 1714, the memory, and/or the recording medium unless noted otherwise, since the cache memory performs part of the function of the RAM 1714.

The CPU 1712 may perform various types of processing on the data read from the RAM 1714, which includes various types of operations, processing of information, condition judging, search/replace of information, etc., as described throughout this disclosure and designated by an instruction sequence of programs, and writes the result back to the RAM 1714. For example, when performing condition judging, the CPU 1712 may judge whether each type of variable is larger, smaller, no smaller than, no greater than, or equal to the other variable or constant, and when the condition judging results in the affirmative (or in the negative), the process branches to a different instruction sequence or calls a subroutine.

In addition, the CPU 1712 may search for information in a file, a database, etc., in the recording medium. For example, when a plurality of entries, each having an attribute value of a first attribute is associated with an attribute value of a second attribute, are stored in a recording apparatus, the CPU 1712 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 1701, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The invention claimed is:

1. A computer program product comprising a computer readable storage medium having program instructions embodied therewith, the program instructions executable by a processor or programmable circuitry to cause the processor or programmable circuitry to perform operations comprising:

receiving, from a first communication device of a user in a vehicle, a verbal request for a product or service at a receiving time;

generating a first signal, the first signal indicating the requested product or service, the receiving time for the requested product or service, and a moving route of the vehicle;

determining a first receiving location of the requested product or service based on the receiving time, the moving route indicated by the first signal, and a selection by the user to err on an early side or a late side of completion of the requested product or service in relation to the receiving time indicated by the first signal;

transmitting a second signal to a second communication device of a first merchant associated with the determined first receiving location, the second signal indicating a first instruction to prepare the requested product or service;

in response to a traffic condition impacting the moving route indicated by the first signal, canceling the first instruction indicated by the second signal and transmitting a third signal to a third communication device of a second merchant having a store location off the moving route and a delivery site on the moving route, the third signal indicating a second instruction to prepare the requested product or service at the store location and to deliver the requested product or service to the delivery site; and in response to canceling the first instruction indicated by the second signal, assigning the canceled product or service to a new first communication device located in another vehicle and adjusting the receiving time to a new receiving time based on a request of a second user associated with the new first communication device;

wherein the second signal indicates an instruction to finish preparing the requested product or service at a modified receiving time based on the receiving time and the selection or to begin or finish preparing the requested product or service at a specified time prior to the receiving time, the specified time determined based on the selection.

2. The computer program product of claim 1, wherein the receiving location is a store offering the requested product or service.

3. The computer program product of claim 1, wherein:
the receiving location is a delivery site located on or near the moving route a distance away from a store offering the requested product or service,
the second signal indicates an instruction to begin or finish preparing the requested product or service at a specified time prior to the receiving time, and
the specified time is determined based on the distance.

4. The computer program product of claim 3, wherein the determining includes choosing the receiving location from a plurality of predetermined delivery sites.

5. The computer program product of claim 1, wherein the determining includes determining the receiving location based on a weather condition of the moving route.

6. The computer program product of claim 1, wherein the determining includes:
- estimating a position on the moving route of the vehicle at the receiving time; and
- choosing a store offering the requested product or service based on the estimated position.

7. The computer program product of claim 1, wherein the determining is performed at predetermined intervals.

8. The computer program product of claim 1, wherein the second signal indicates an instruction to finish preparing the requested product or service at the receiving time or to begin or finish preparing the requested product or service at a specified time prior to the receiving time, and
- the operations further comprise transmitting a correction signal to the second communication device that received the second signal or a previous correction signal, the correction signal indicating an instruction to finish preparing the requested product or service at a new receiving time or to begin or finish preparing the requested product or service at an updated specified time prior to the new receiving time or indicating that an instruction of the second signal or a previous correction signal is canceled.

9. The computer program product of claim 1, wherein:
- the operations further comprise maintaining a store database in which information indicating an estimated preparation time is stored in association with products or services and a plurality of stores offering the products or services, and
- the maintaining includes updating the store database to reflect an increase or decrease in the estimated preparation time associated with a product or service offered at a store due to a current workload or preparation speed condition of the store.

10. The computer program product of claim 1, wherein the operations further comprise:
- predicting an arrival time of the first communication device at the receiving location based on the moving route indicated by the first signal; and
- updating the receiving time based on the predicted arrival time.

11. The computer program product of claim 10, wherein the predicting includes predicting the arrival time based on a traffic or weather condition of the moving route.

12. The computer program product of claim 10, wherein the operations further comprise:
- transmitting a fourth signal to the first communication device, the fourth signal indicating a plurality of candidate receiving locations and associated candidate predicted arrival times; and
- receiving a fifth signal originating from the first communication device, the fifth signal indicating a choice of one of the candidate receiving locations and associated candidate predicted arrival times, and
- the determining includes determining the receiving location based on the choice.

13. The computer program product of claim 10, wherein the predicting is performed at predetermined intervals.

14. The computer program product of claim 1, wherein the first communication device is a vehicle navigation device installed in the vehicle or a mobile communication device running a vehicle navigation program.

15. An apparatus comprising:
- a memory having instructions; and
- a processor configured to execute the instructions to perform operations comprising:
- receiving, from a first communication device of a user in a vehicle, a verbal request for a product or service at a receiving time;
- generating a first signal, the first signal indicating the requested product or service, the receiving time for the requested product or service, and a moving route of the vehicle;
- determining a first receiving location of the requested product or service based on the receiving time, the moving route indicated by the first signal, and a selection by the user to err on an early side or a late side of completion of the requested product or service in relation to the receiving time indicated by the first signal;
- transmitting a second signal to a second communication device of a first merchant associated with the determined first receiving location, the second signal indicating a first instruction to prepare the requested product or service;
- in response to a traffic condition impacting the moving route indicated by the first signal, canceling the first instruction indicated by the second signal and transmitting a third signal to a third communication device of a second merchant having a store location off the moving route and a delivery site on the moving route, the third signal indicating a second instruction to prepare the requested product or service at the store location and to deliver the requested product or service to the delivery site; and
- in response to canceling the first instruction indicated by the second signal, assigning the canceled product or service to a new first communication device located in another vehicle and adjusting the receiving time to a new receiving time based on a request of a second user associated with the new first communication device;
- wherein the second signal indicates an instruction to finish preparing the requested product or service at a modified receiving time based on the receiving time and the selection or to begin or finish preparing the requested product or service at a specified time prior to the receiving time, the specified time determined based on the selection.

* * * * *